(12) United States Patent
Fukada et al.

(10) Patent No.: US 9,562,805 B2
(45) Date of Patent: Feb. 7, 2017

(54) WEIGHT MEASUREMENT APPARATUS, BIOLOGICAL MEASUREMENT APPARATUS, STORAGE MEDIUM ENCODED WITH WEIGHT MEASUREMENT PROGRAM AND METHOD

(71) Applicant: TANITA CORPORATION, Tokyo (JP)

(72) Inventors: Kosei Fukada, Tokyo (JP); Masayuki Kenmochi, Tokyo (JP); Kazuyasu Koyama, Tokyo (JP)

(73) Assignee: TANITA CORPORATION, Tokyo (JP)

( * ) Notice: Subject to any disclaimer, the term of this patent is extended or adjusted under 35 U.S.C. 154(b) by 172 days.

(21) Appl. No.: 14/285,264

(22) Filed: May 22, 2014

(65) Prior Publication Data

US 2014/0345954 A1 Nov. 27, 2014

(30) Foreign Application Priority Data

May 22, 2013 (JP) ................................. 2013-107800
Jul. 9, 2013 (JP) ................................. 2013-143150

(51) Int. Cl.
*G01G 19/50* (2006.01)
*G01G 19/415* (2006.01)
(Continued)

(52) U.S. Cl.
CPC .............. *G01G 19/50* (2013.01); *G01G 19/44* (2013.01); *G01G 23/166* (2013.01); *G01G 19/415* (2013.01)

(58) Field of Classification Search
CPC ...... G01G 19/415; G01G 19/44; G01G 19/50; G01G 23/16; G01G 23/166
See application file for complete search history.

(56) References Cited

U.S. PATENT DOCUMENTS 3,774,705 A * 11/1973 Muroga ............... G01G 23/362
177/173
4,676,329 A * 6/1987 Reichmuth ............ G01G 23/16
177/165
(Continued)

FOREIGN PATENT DOCUMENTS

CN 201043912 Y 4/2008
CN 101387543 A 3/2009
(Continued)

OTHER PUBLICATIONS

Office Action dated Jan. 18, 2016, received in corresponding Chinese application No. 201410220108.1, 8 pages.
(Continued)

*Primary Examiner* — Natalie Huls
(74) *Attorney, Agent, or Firm* — Foley & Lardner LLP

(57) ABSTRACT

A scale includes a load detection unit detecting a load to a placing unit, a storage unit storing a zero point in advance, a calculation/control unit calculating a load calculation value using a load signal corresponding to the load to the placing unit, based on an output of the load detection unit, and a display unit displaying the load calculation value. When a load is applied to the placing unit, the calculation/control unit calculates a loading state load calculation value based on the load signal in a loading state and the zero point of the storage unit. Subsequently, when the load is removed from the placing unit in a non-loading state, the calculation/control unit calculates a non-loading state load calculation value based on load signals in the loading and non-loading states, and displays the non-loading state load calculation value on the display unit.

15 Claims, 10 Drawing Sheets

(51) Int. Cl.
*G01G 19/44* (2006.01)
*G01G 23/16* (2006.01)

(56) References Cited

U.S. PATENT DOCUMENTS

| | | | |
|---|---|---|---|
| 5,321,634 A | 6/1994 | Obata et al. | |
| 7,790,992 B1* | 9/2010 | Abbruscato | G01G 19/44 177/244 |
| 7,902,467 B2* | 3/2011 | Suzuki | A61B 5/4872 177/50 |
| 8,475,367 B1* | 7/2013 | Yuen | G06F 19/3418 128/920 |
| 2002/0129978 A1* | 9/2002 | Montagnino | A61B 5/0537 177/126 |
| 2004/0035610 A1* | 2/2004 | Chan | G01G 21/23 177/25.11 |
| 2006/0241360 A1* | 10/2006 | Montagnino | A61B 5/0537 600/310 |
| 2008/0314648 A1 | 12/2008 | Suzuki et al. | |
| 2009/0057035 A1* | 3/2009 | Oseko | A61B 5/0537 177/25.13 |
| 2009/0076756 A1* | 3/2009 | Inoue | G01G 23/16 702/87 |
| 2009/0088661 A1* | 4/2009 | Suzuki | G01G 19/50 600/547 |
| 2010/0224420 A1* | 9/2010 | Miyanaga | A63F 13/533 177/25.12 |
| 2010/0331629 A1* | 12/2010 | Sato | A61B 5/0537 600/300 |
| 2011/0172943 A1* | 7/2011 | Roberts | G01G 23/166 702/87 |
| 2011/0226035 A1* | 9/2011 | Date | G01G 19/50 73/1.13 |
| 2013/0333955 A1* | 12/2013 | Jefferson | G01G 23/18 177/1 |
| 2013/0341104 A1* | 12/2013 | Suzuki | G01G 19/44 177/50 |
| 2014/0090444 A1* | 4/2014 | Onomatsu | G01G 23/166 73/1.13 |
| 2014/0138164 A1* | 5/2014 | Khanuja | G01G 19/44 177/1 |
| 2014/0224552 A1* | 8/2014 | Shimizu | G01G 19/50 177/25.13 |
| 2014/0285491 A1* | 9/2014 | Otsubo | A61B 5/742 345/440 |
| 2014/0326517 A1* | 11/2014 | Gomez | G01G 19/50 177/1 |
| 2014/0378860 A1* | 12/2014 | Nakamura | A61B 5/0537 600/547 |
| 2015/0109105 A1* | 4/2015 | Shimizu | A61B 5/117 340/5.82 |

FOREIGN PATENT DOCUMENTS

| | | |
|---|---|---|
| CN | 202836711 U | 3/2013 |
| DE | 28 05 368 A1 | 8/1979 |
| EP | 0 456 989 A2 | 11/1991 |
| JP | 2000-068984 | 3/2000 |
| JP | 4940026 B | 12/2008 |
| JP | 2009-112709 A | 5/2009 |
| JP | 2012-021845 A | 2/2012 |
| JP | 2012-034847 A | 2/2012 |

OTHER PUBLICATIONS

Office Action dated Sep. 20, 2016, received in corresponding German Application No. 10 2014 007 571.0, 9 pages.

* cited by examiner

FIG. 4A
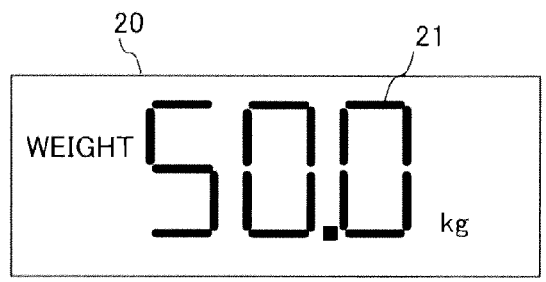
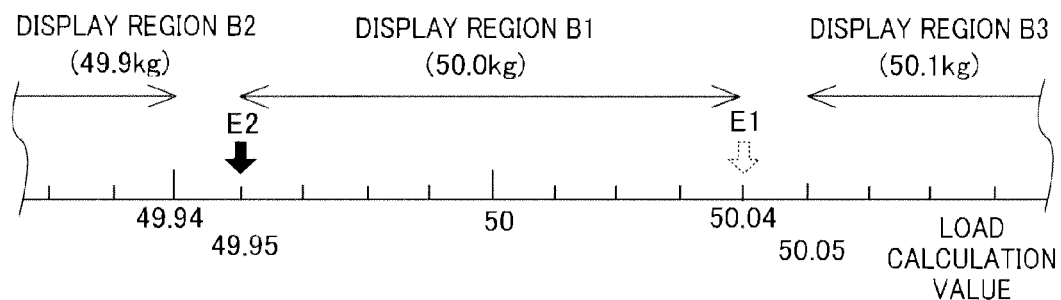
FIG. 4B
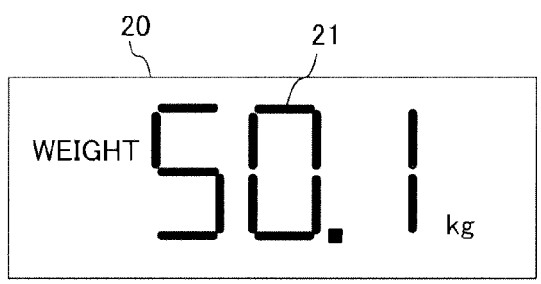
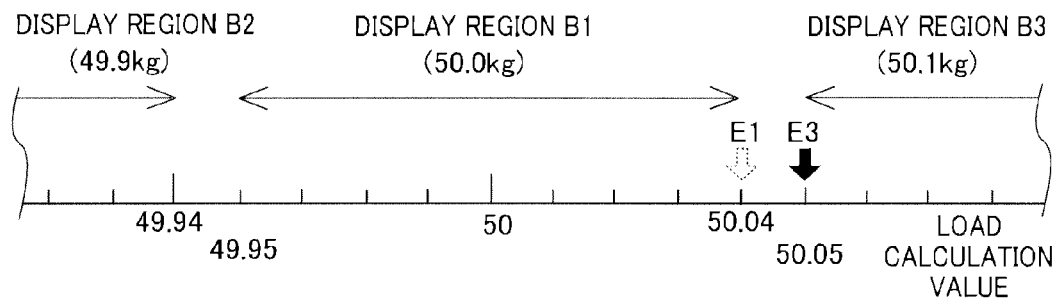

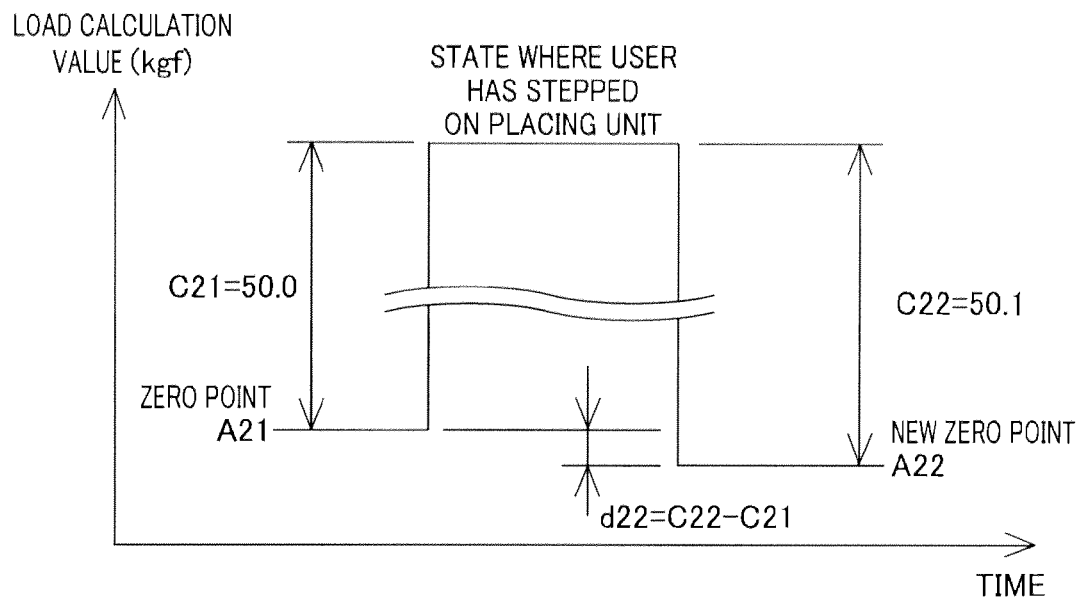
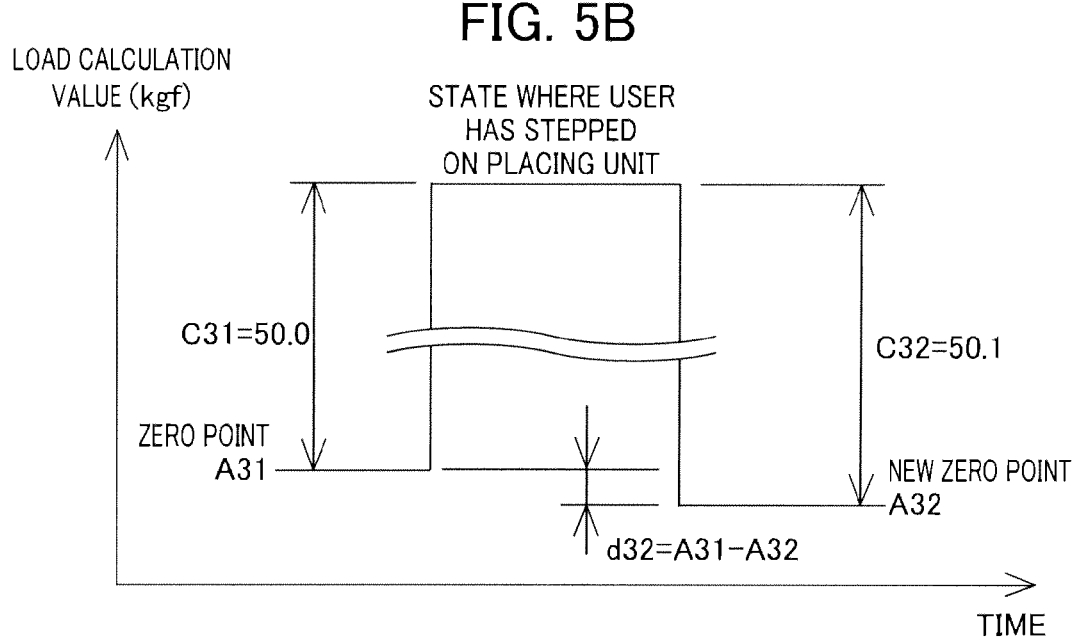

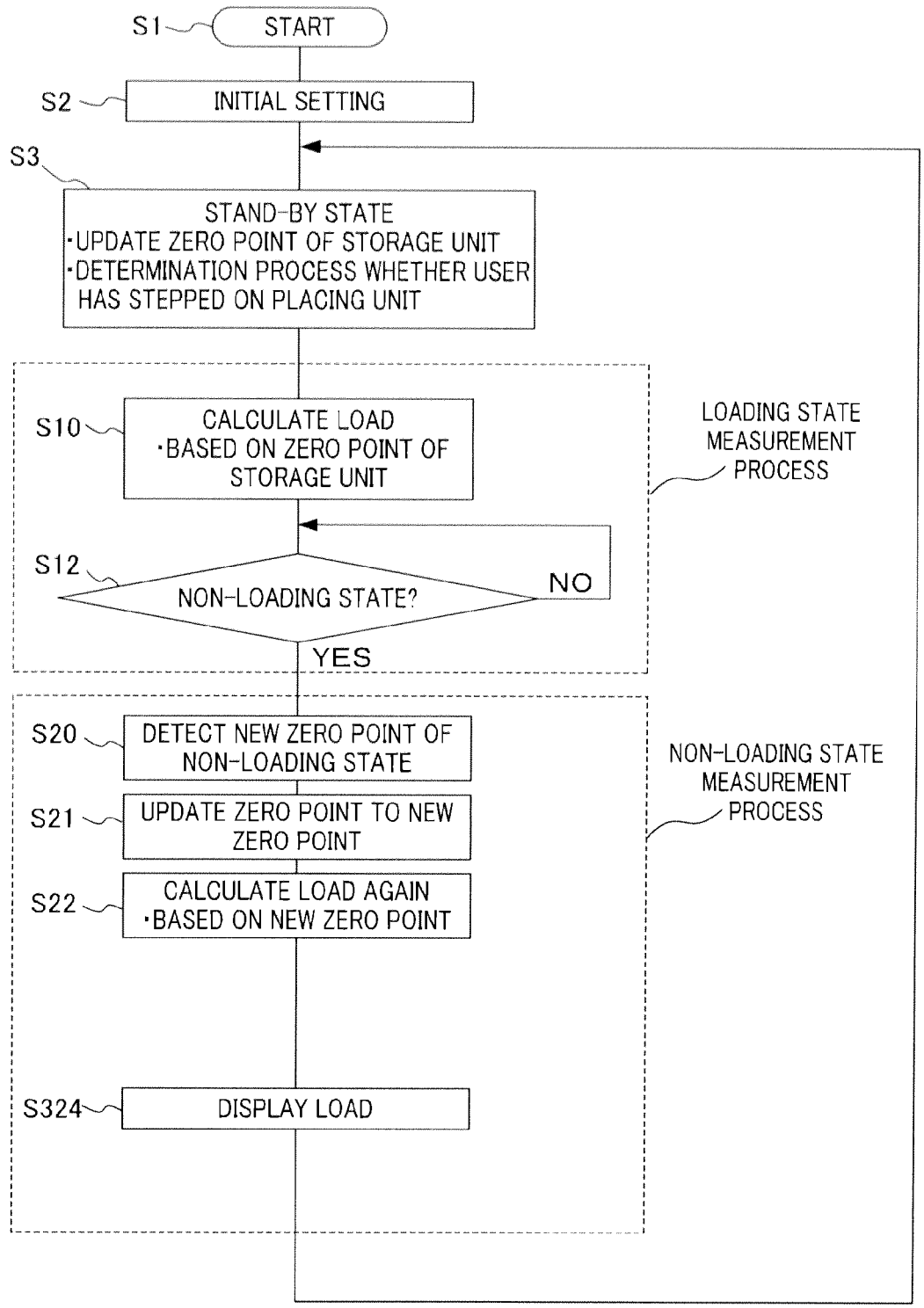

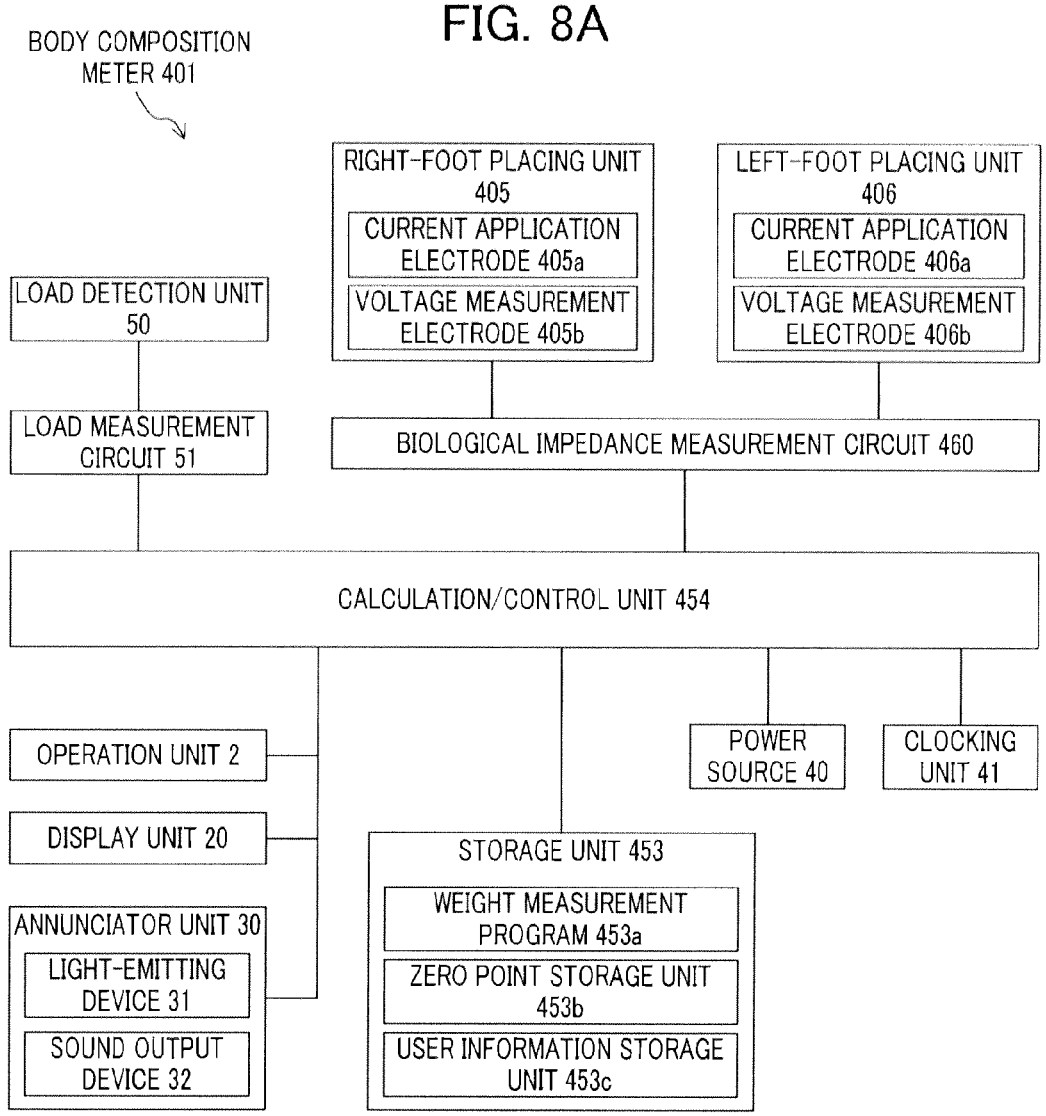

WEIGHT MEASUREMENT APPARATUS, BIOLOGICAL MEASUREMENT APPARATUS, STORAGE MEDIUM ENCODED WITH WEIGHT MEASUREMENT PROGRAM AND METHOD

This application is based on and claims the benefit of priority from Japanese Patent Applications No. 2013-107800, filed on 22 May 2013, and No. 2013-143150, filed on 9 Jul. 2013 the content of which is incorporated herein by reference.

BACKGROUND OF THE INVENTION

Field of the Invention

The present invention relates to a weight measurement apparatus, a biological measurement apparatus, and a weight measurement program, for measuring a weight, based on a difference between an output in a state where an object to be measured is loaded on a placing unit and an output in a state where an object to be measured is not loaded on the placing unit.

Related Art

There exists a step-on type weight scale which can measure simply by a user stepping on the placing unit without the user operating a switch for consciously starting measurement.

This conventional step-on type weight scale updates a zero point at predetermined time intervals during nonuse, to acquire as correctly as possible the zero point as an output value in the state where the object is not put on the placing unit. A weight value calculated based on the difference is referred to as a measurement result. This difference is between the output value in the state where the object has stepped on the placing unit and the last updated zero point.

For example, the following step-on type weight scale is disclosed.

The step-on type weight scale of JP 4940026 B is to update the zero point when it is assumed that the zero point is not changed, in a placement state suitable for updating the zero point, at predetermined time intervals. A step-on type weight measurement apparatus of JP 2000-68984 A is to update the zero point at predetermined (updating) time intervals, and is to change the updating time interval of the next zero point, in accordance with a difference between a zero point at the last updated time and a zero point at this updated time.

Not just the step-on type weight scale, there also exists a weight scale which performs measurement by a user operating a switch for consciously starting the measurement. Even this switch-operation type weight scale updates the zero point at predetermined time intervals during nonuse.

However, in the conventional step-on type weight scale or the switch-operation type weight scale, the zero point is not necessarily updated right before an object to be measured is put on a placing unit. Thus, when the measurement environment (placement angle or temperature) has been changed, after the zero point has been acquired at last, during the time since the object to be measured has stepped on the placing unit until the measurement, an incorrect effect is somehow produced on the weight value as a measurement result. At this time, when calculating a correct measurement result, the measurement is necessarily performed, thus requiring procedures for that.

SUMMARY OF THE INVENTION

An object of the present invention is to provide a weight measurement apparatus, a biological measurement apparatus, and a weight measurement program, for enabling to announce a user of a correct measurement result without extra procedures.

The present invention realizes the object using the following solutions. For easy understanding, descriptions will be made using reference numerals corresponding into embodiments of the present invention, but the present invention is not limited to these. Those configurations described with attached reference numerals may appropriately be improved, and at least a part thereof may be replaced with another constituent element(s).

In a first invention, there is provided a weight measurement apparatus comprising: a load detection unit (50) configured to detect a load to a loading unit (3); a storage unit (53) configured to store a zero point in advance; a control unit (54) configured to calculate a load calculation value using a load signal corresponding to the load to the loading unit, based on an output of the load detection unit; and a display unit (20) configured to display the load calculation value, wherein the control unit (54) performs a loading state measurement process (S10, S11) for calculating a loading state load calculation value as a load calculation value which is calculated based on a load signal in a loading state and the zero point of the storage unit, in the loading state where a load is applied to the loading unit; and a non-loading state measurement process (S24, S324) for calculating (S22) a non-loading state load calculation value as a load calculation value which is calculated based on load signals in the loading state and in a non-loading state, and displaying the load calculation value on the display unit, after the loading state, and in the non-loading state where the load is removed from the loading unit (S12: YES).

In a second invention, there is provided the weight measurement apparatus according to the first invention, wherein the control unit (54) displays (S11) the loading state load calculation value on the display unit, in the loading state measurement process, and redisplays (S24) the non-loading state load calculation value on the display unit, in the non-loading state measurement process.

In a third invention, there is provided the weight measurement apparatus according to the second invention, wherein the display unit (20) displays the load calculation value in a numerical value, and the control unit (54) redisplays the non-loading state load calculation value on the display unit in the non-loading state measurement process, when there is a difference between a numerical value (21) to be displayed on the display unit as the loading state load calculation value and a numerical value (21) to be displayed on the display unit as the non-loading state load calculation value.

In a fourth invention, there is provided the weight measurement apparatus according to the second invention, wherein the display unit (20) displays the load calculation value in a numerical value, and the control unit (54) redisplays the non-loading state load calculation value on the display unit in the non-loading state measurement process, when there is a difference between a numerical value (21) to be displayed on the display unit as the loading state load calculation value and a numerical value (21) to be displayed on the display unit as the non-loading state load calculation value, and when there is a difference of a predetermined threshold value or greater between the numerical value to be displayed on the display unit as the loading state load calculation value and the numerical value to be displayed on the display unit as the non-loading state load calculation value.

In a fifth invention, there is provided the weight measurement apparatus according to the second invention, wherein the control unit (54) determines as to whether to redisplay the non-loading state load calculation value on the display unit in the non-loading state measurement process, in accordance with a determination result regarding a difference (d32) between the zero point (A31) stored in advance in the storage unit and a zero point (A32) in the non-loading state.

In a sixth invention, there is provided the weight measurement apparatus according to the second invention, wherein the control unit (54) determines as to whether to redisplay the non-loading state load calculation value on the display unit in the non-loading state measurement process, in accordance with a determination result regarding a difference (d22) between the loading state load calculation value (C21) and the non-loading state load calculation value (C22).

In a seventh invention, there is provided the weight measurement apparatus according to any one of the second to sixth inventions, further comprising an annunciator unit (30) configured to perform announcement for a user, wherein the control unit (54) activates (S25) the annunciator unit, when to redisplay the non-loading state load calculation value on the display unit (20) in the non-loading state measurement process.

In an eighth invention, there is provided the weight measurement apparatus according to any one of the first to seventh inventions, wherein the control unit (54) updates the zero point stored in advance in the storage unit (53) to a zero point in the non-loading state, and stores (S21) the zero point.

In a ninth invention, there is provided the weight measurement apparatus according to any one of the first to eighth inventions, wherein the control unit (54) updates the zero point stored in advance in the storage unit to a zero point in a stand-by state based on a load signal in the stand-by state and stores (S3) the zero point, when a predetermined condition has been satisfied, in the stand-by state where the weight measurement apparatus is not used.

In a tenth invention, there is provided the weight measurement apparatus according to the ninth invention, wherein the control unit (54) determines (S3) that the predetermined condition has been satisfied, at least any one of, when a predetermined time period has elapsed, when a placement angle of the weight measurement apparatus is equal to or lower than a reference value, and when a peripheral temperature difference is equal to or greater than a reference value.

In an eleventh invention, there is provided the weight measurement apparatus according to any one of the first to tenth inventions, wherein the storage unit includes a user information storage unit which stores user information including a load calculation value and user identification information in association with each other, and the control unit specifies the user identification information corresponding to the load calculation value approximated to the loading state load calculation value based on the user information storage unit, in the loading state measurement process, specifies the user identification information corresponding to the load calculation value approximated to the non-loading state load calculation value based on the user information storage unit, when there is a difference between the non-loading state load calculation value and the loading state load calculation value, and when there is a difference of a predetermined threshold or greater between the non-loading state load calculation value and the loading state load calculation value, in the non-loading state measurement process, and performs a user display process for displaying lately specified user identification information on the display unit.

In a twelfth invention, there is provided the weight measurement apparatus according to the eleventh invention, wherein the control unit updates the load calculation value corresponding to the lately specified user identification information stored in the user information storage unit, to the non-loading state load calculation value, and stores the non-loading state load calculation value.

In a thirteenth invention, there is provided a biological measurement apparatus comprising: a load detection unit (50) configured to detect a load to a loading unit; a plurality of electrode members (405, 406) configured to be arranged to be in contact with a user; a zero point storage unit (453b) configured to store a zero point in advance; a user information storage unit (453c) configured to store user information including a load calculation value, biological impedance, and user identification information in association with each other; a control unit (454) configured to calculate a load calculation value using a load signal corresponding to the load to the loading unit, based on an output of the load detection unit; and a display unit (20) configured to display the load calculation value, wherein the control unit (454), in a loading state where the load is applied to the loading unit, performs a loading state measurement process (S410) for calculating a loading state load calculation value as a load calculation value which is calculated based on a load signal in the loading state and the zero point of the zero point storage unit, a biological impedance measurement process (S410a) for calculating measurement biological impedance, by applying an electric current to the electrode members in a state of being in contact with the user, and a loading state user specifying process (S410b) for specifying the user identification information corresponding to approximated biological impedance and the load calculation value based on the user information storage unit, using the measurement biological impedance and the loading state load calculation value, and after the loading state, and in the non-loading state where the load is removed from the loading unit (S412: YES), a non-loading state measurement process (S422) for calculating a non-loading state load calculation value as a load calculation value which is calculated based on load signals in the loading state and in the non-loading state, a non-loading state user specifying process (S423b) for specifying, based on the user information storage unit, the user identification information corresponding to approximated biological impedance and the load calculation value, based on the measurement biological impedance and the non-loading state load calculation value, when there is a difference between the non-loading state load calculation value and the loading state load calculation value, and when there is a difference of a predetermined threshold value or greater between the non-loading state load calculation value and the loading state load calculation value (S423a: YES), and a display process (S424, S524) for displaying, on the display unit, the non-loading state load calculation value and the lately specified user identification information.

In a fourteenth invention, there is provided the biological measurement apparatus according to the thirteenth invention, wherein the control unit (454) displays (S411) the loading state load calculation value on the display unit, in the loading state measurement process, and redisplays (S424) the non-loading state load calculation value on the display unit, in the display process.

In a fifteenth invention, there is provided the biological measurement apparatus according to the thirteenth and fourteenth inventions, wherein the user information storage unit (453c) stores physical data of the user in association with the user identification information, and the control unit (454) calculates (S410c) data regarding physical compositions, using the physical data corresponding to the user identification information, the measurement biological impedance, and the loading state load calculation value, in the loading state user specifying process, calculates (S423c) data regarding physical compositions, using the physical data corresponding to the user identification information, the measurement biological impedance, and the non-loading state load calculation value, in the non-loading state user specifying process, and displays (S424, S524) the lately calculated data regarding the physical composition on the display unit, in the display process.

In a sixteenth invention, there is provided a non-transitory storage medium encoded with a machine readable weight measurement program (53a) for a computer (1) including a storage unit which stores a zero point in advance, the storage medium including instructions for causing the computer to implement a method. The method comprises causing the computer to function as a control unit (54) configured to calculate a load calculation value using a load signal corresponding to a load applied to a loading unit (3). The method also comprises causing the control unit to perform a loading state measurement process (S10, S11) for calculating a loading state load calculation value as a load calculation value to be calculated, based on a load signal in a loading state and the zero point of the storage unit, in the loading state where a load is applied to the loading unit, and a non-loading state measurement process for calculating (S22) a non-loading state load calculation value as a load calculation value to be calculated based on a load signal in the loading state and a load signal in a non-loading state, and displaying (S24, S324) the non-loading state load calculation value on a display unit, after the loading state, and in the non-loading state where the load is removed from the loading unit.

In a seventeenth invention, there is provided the non-transitory storage medium according to the sixteenth invention, wherein the program causes the control unit (54) to display (S11) the loading state load calculation value on the display unit, in the loading state measurement process, and redisplay (S24) the non-loading state load calculation value on the display unit, in the non-loading state measurement process.

In an eighteenth invention, there is provided the non-transitory storage medium according to the sixteenth and seventeenth inventions, wherein the storage unit of the computer includes a user information storage unit which stores user information including a load calculation value and user identification information in association with each other, and the program causes the control unit to specify the user identification information corresponding to the load calculation value approximated to the loading state load calculation value, based on the user information storage unit, in the loading state measurement process, specify the user identification information corresponding to the load calculation value approximated to the non-loading state load calculation value based on the user information storage unit, in the non-loading state measurement process, when there is a difference between the non-loading state load calculation value and the loading state load calculation value, and when there is a difference of a predetermined threshold value or greater between the non-loading state load calculation value and the loading state load calculation value, and perform a user display process for displaying the lately specified user identification information on the display unit.

In a nineteenth invention, there is provided a method for measuring weight by a computer including a storage unit which stores a zero point in advance. The method comprises causing the computer to function as a control unit configured to calculate a load calculation value using a load signal corresponding to a load applied to a loading unit. The method also comprises causing the control unit to perform a loading state measurement process for calculating a loading state load calculation value as a load calculation value to be calculated, based on a load signal in a loading state and the zero point of the storage unit, in the loading state where a load is applied to the loading unit, and a non-loading state measurement process for calculating a non-loading state load calculation value as a load calculation value to be calculated based on a load signal in the loading state and a load signal in a non-loading state, and displaying the non-loading state load calculation value on a display unit, after the loading state, and in the non-loading state where the load is removed from the loading unit.

According to the present invention, the following effects can be produced.

In the first and sixteenth inventions, a load is calculated based on an output in a loading state and an output in a non-loading state, when the loading state has shifted to the non-loading state, and the load calculated based on the output in the non-loading state is displayed. This enables to announce the user of the accurate load.

In the second and seventeenth inventions, the load calculated based on a zero point of the storage unit is displayed, in a loading state, thus enabling to announce the user of the load right after use, the load calculated based on the output in the non-loading state is redisplayed. As a result, it is possible to announce the user of the correct load. In this case, the user can acquire the accurate load, without performing a trouble procedure, such as a switch operation for re-measurement.

In the third invention, redisplay is simply performed only when a change is made in the display of the display unit, because a difference between numerical display in the loading state and numerical display in the non-loading state is referred as a determination standard for the redisplay.

In the fourth invention, a non-loading state load calculation value is redisplayed, when there is a difference between a numerical value to be displayed as a loading state load calculation value and a numerical value to be displayed as a non-loading state load calculation value, and when the difference of these values is equal to or greater than a predetermined threshold value. As a result, for example, in a scene where high accurate measurement is not necessary, it is possible to skip the procedure for the redisplay.

In the fifth invention, a determination is made on a difference between a pre-set zero point and a zero point in the non-loading state, and the load is redisplayed, thus enabling to use the difference as a determination standard for redisplay.

In the sixth invention, a determination is made on a difference between the load in the loading state and the load in the non-loading state, and the load on the display unit is redisplayed, thus enabling to use the difference as a determination standard for redisplay.

In the seventh invention, an annunciator unit is activated, when redisplay is performed on the display unit. Thus, it is possible to announce the user of a difference between the load in the loading state and the load in the non-loading state.

In the eighth invention, the zero point of the storage unit is updated to a zero point in the non-loading state. Thus, it is possible to accurately measure the load, when it is in the loading state where the user uses it for the next time.

In the ninth invention, the zero point is updated based on a predetermined condition(s) in a stand-by state where the weight measurement apparatus is not used, thereby suppressing updating of the zero point more than is necessary.

In the tenth invention, the zero point can be updated, when a predetermined time period has elapsed in a stand-by state, when a placement angle of this weight measurement apparatus is equal to or lower than a reference value, or when the peripheral temperature is equal to or greater than a standard value. In the eleventh and eighteenth inventions, the latest load is stored together with user identification information as user information, thereby enabling to specify and display a user based on the load calculated based on an output in the loading state and an output in the non-loading state. Thus, it is possible to specify the user without causing the user to perform a switch operation for specifying the user before measurement.

In the twelfth invention, the load calculated in the non-loading state is stored, in association with the user identification information as the latest load, thereby enabling to store the accurate load. At the time the user uses it for the next time, it can be used as information for specifying the user.

In the thirteenth invention, the latest load and the biological impedance are stored together with the user identification information, as user information, thereby enabling to specify and display the user, based on the load calculated using the output in the loading state and the output in the non-loading state and the measured biological impedance. The user can accurately be specified, based not only on the load, but also the biological impedance.

In the fourteenth invention, the load calculated based on the zero point of the storage unit is displayed, in the loading state. Thus, right after the user, it is possible to announce the user of the load and to redisplay the load calculated based on the output in the non-loading state, thereby enabling to announce the user of the accurate load as well.

In the fifteenth invention, data regarding the physical compositions can be calculated and displayed based on the load and the biological impedance. When the load calculated based on the output in the loading state and the output in the non-loading state is lower than a predetermined threshold value, the display is performed using data regarding the physical compositions calculated in accordance with the measurement of the load in the loading state, thus enabling to announce the user of it as soon as possible.

BRIEF DESCRIPTION OF THE DRAWINGS

FIGS. 4A and 4B are diagrams for explaining load calculation of the first embodiment and a diagram for explaining a display screen of a display unit 20;

FIGS. 5A and 5B are diagrams for explaining load calculation of a second embodiment;

FIG. 6 is a flowchart illustrating a process of a scale of a third embodiment;

FIGS. 8A and 8B are block diagrams of the body composition meter 401 of the fourth embodiment and a diagram for explaining a user information storage unit 453c;

DETAILED DESCRIPTION OF THE INVENTION

Descriptions will now specifically be made to embodiments of a scale which measures a weight of a person to be measured (subject), as one kind of a weight measurement apparatus which measures a weight of a target object to be measured, according to the present invention, with reference to the drawings.

(First Embodiment)

Figure 1A:
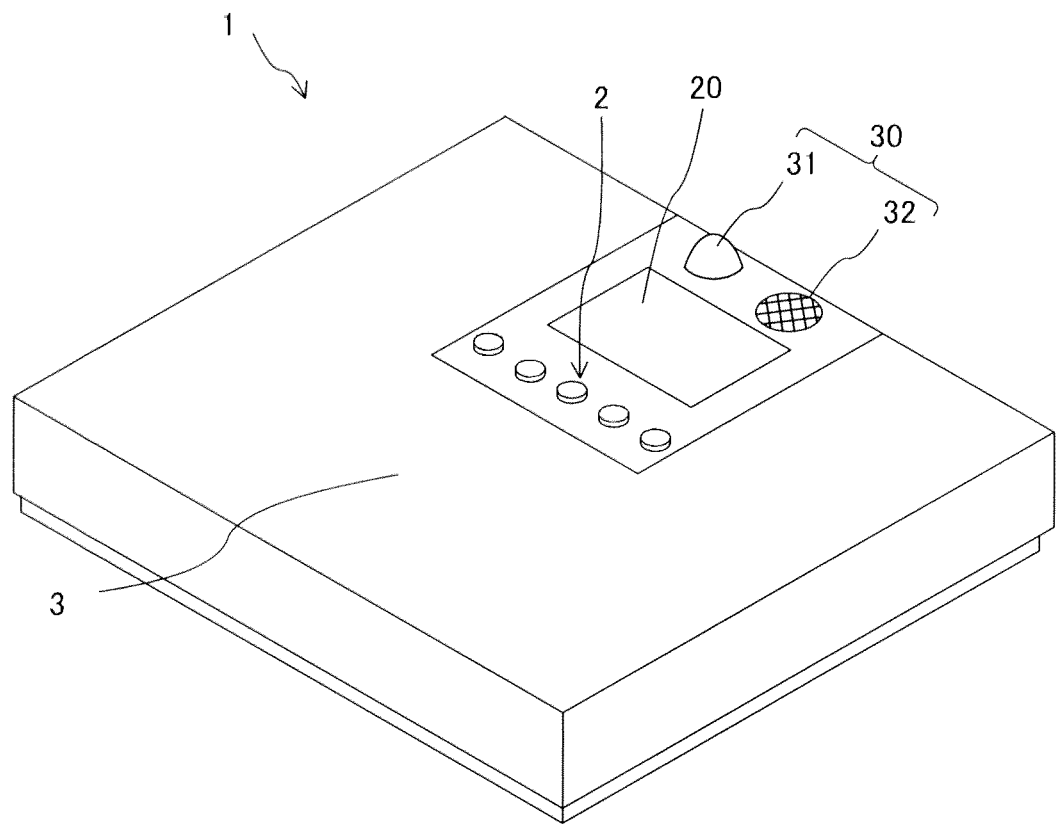
FIGS. 1A and 1B are diagrams for explaining a scale 1 of a first embodiment.
Figure 1B:
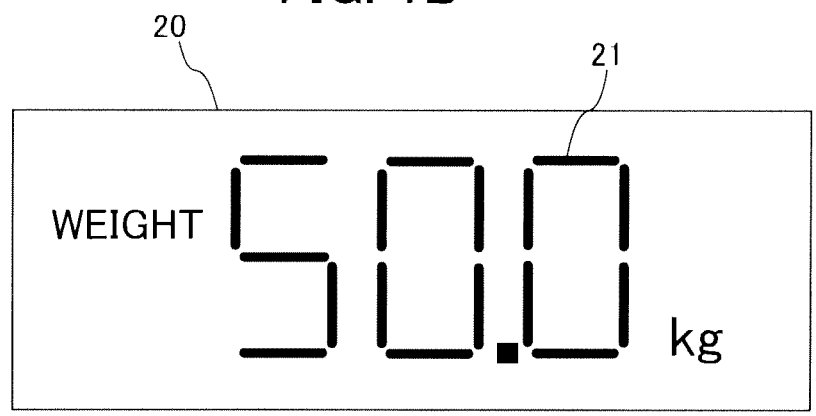

FIGS. 1A and 1B are diagrams for explaining the scale 1 of the first embodiment.

FIG. 1A a perspective diagram of the scale 1 of the first embodiment.

FIG. 1B is a diagram illustrating a display screen of a display unit 20 of the first embodiment.

The scale 1 is a weight measurement apparatus which measures a weight (load) of a user (subject).

As illustrated in FIG. 1A, the scale 1 has a base and a placing unit 3 (loading unit), as outer bodies. The outer surface of the placing unit 3 includes an operation unit 2, a display unit 20, and an annunciator unit 30.

The operation unit 2 is an operation member that the user operates. The operation unit 2 includes a plurality of push buttons. The operation unit 2 accepts operations for initial setting, for example, at the power activation.

The placing unit 3 is a part on which the user steps at measurement.

The display unit 20 is a liquid crystal display device. The display unit 20 is provided in the placing unit 3, thus enabling the user to visibly recognize it.

As illustrated in FIG. 1B, the display unit 20 displays load display 21 in a numerical value. For example, the minimum display unit is 0.1 (kg), and the weight can be displayed in the unit of 0.1 (kg). In the weight measurement apparatus, such as a scale, it is generally known that the minimum display unit is called a "scale interval."

The weight is displayed in "kg" by way of example, but may be displayed in "st (stone)," "oz (ounce)." The unit of the minimum display is the numerical value "0.1" by way of example, and any other values, such as "0.05" and "0.2" are also applicable.

The annunciator unit 30 is a device for announcing the user of redisplaying (as will be described later) of the load. The annunciator unit 30 includes a light emitting device 31 and a sound output device 32.

The light emitting device 31 is a lamp. The backlight of the display unit 20 may also serve as the light emitting device 31.

The sound output device 32 is a speaker or a buzzer which generates melody or a warning sound.

Figure 2:
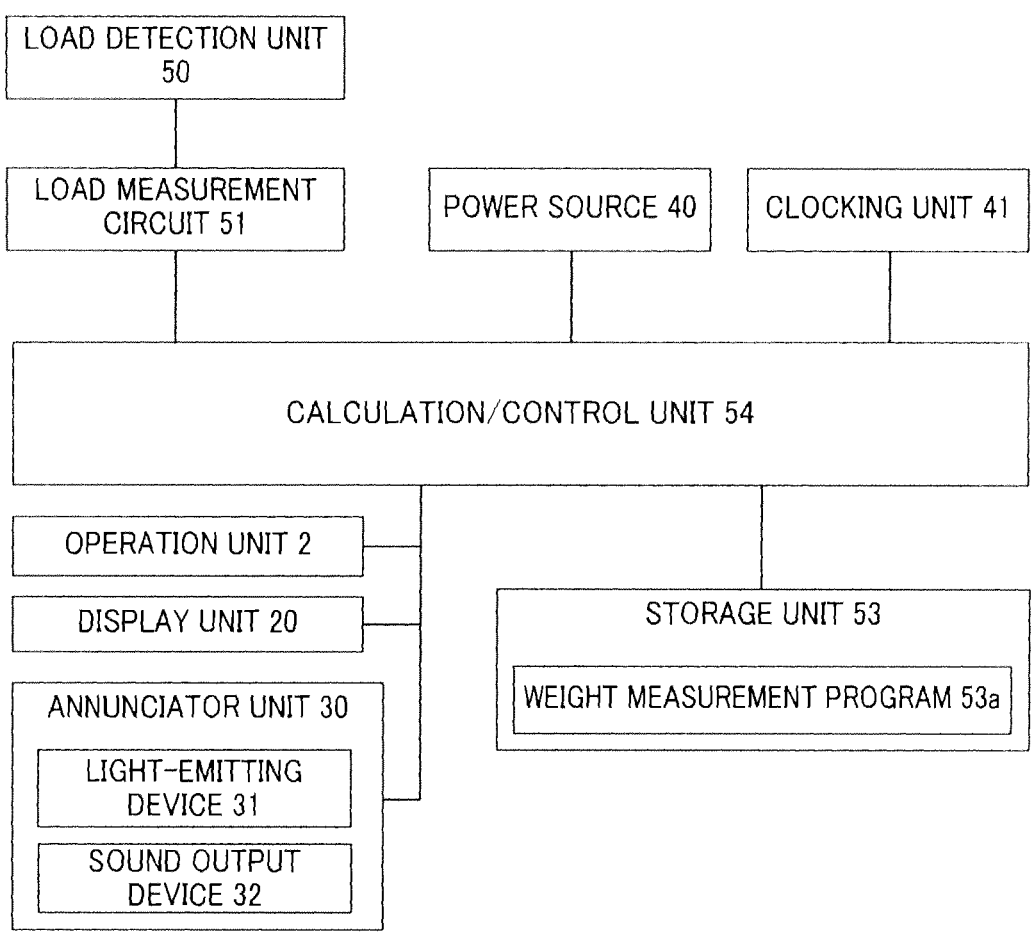
FIG. 2 is a block diagram of the scale 1 of the first embodiment.

FIG. 2 is a block diagram of the scale 1 according to the first embodiment.

The scale 1 includes a power source 40, a clocking unit 41, a load detection unit 50, a load measurement circuit 51, a storage unit 53, and a calculation/control unit 54, in addition to the above-described hardware.

In the present invention, the "computer" implies an information processing unit which includes a storage device and a control device. The scale 1 is an information processing unit which includes the storage unit 53 and the calculation/control unit 54, and is included in the concept of the computer of the present invention.

The power source 40 supplies electrical system units with electricity. In this embodiment, a battery is used as the power source 40, and other than that, for example, an AC power source or a solar battery may be used.

The clocking unit 41 is a clocking circuit including a counter which measures the time.

The load detection unit 50 is a load cell which detects the weight of the user who has stepped on the placing unit 3. When the load cell is used, the load detection unit 50 is a strain body having an elastic body or a strain gauge, and outputs a load signal corresponding to the load to the placing unit 3 to the load measurement circuit 51 (as will be described later).

The load measurement circuit 51 converts a load signal as an analog signal of the load detection unit 50 into a digital signal, and outputs it to the calculation/control unit 54. That is, the output of the load detection unit 50 is output to the calculation/control unit 54 through the load measurement circuit 51.

The storage unit 53 includes a storage device, such as a semiconductor memory, and stores information necessary for operations of a weight measurement program 53*a* and the scale 1, a measured value of the user (subject), and a measurement history.

The storage unit 53 stores the weight measurement program 53*a*. The weight measurement program 53*a* is a program for performing processes of FIG. 3 and FIG. 4, as will be described later.

The calculation/control unit 54 includes a CPU (Central Processing Unit), and is a control unit which performs calculation necessary for the functions of the scale 1 and generally controls the scale 1. The calculation/control unit 54 appropriately reads and executes various programs stored in the storage unit 53, thereby realizing various functions of the embodiment, in cooperation with the operation unit 2, the display unit 20, the annunciator unit 30, the power source 40, the clocking unit 41, the load detection unit 50, the load measurement circuit 51, and the storage unit 53.

The calculation/control unit 54 calculates the load (kgf) based on the load signal, and displays it on the display unit 20 (thus calculated load is referred to as a "load calculation value").

In this embodiment, the load signal is one calculated based on the output of the load detection unit 50, and represents information corresponding to the load to the placing unit 3. The load signal includes an output signal of the load detection unit 50 and a resultant signal of the output signal which has been processed by the load measurement circuit 51.

Generally, in the scale, the calculation/control unit calculates the load calculation value, and its resolution is higher than that of the load minimum display of the display unit.

For example, the scale 1 of this embodiment has a resolution of 0.01 (kgf). That is, the calculation/control unit 54 calculates the load based on the output of the load detection unit 50 in the unit of 0.01 (kgf). To the contrary, as described above, the minimum display (scale interval) of the display unit 20 is 0.1 (kg).

Thus, the calculation/control unit 54 displays the load calculation value rounded off to one decimal place, on the display unit 20. For example, if the display unit 20 displays "50.0," the load calculation value of the calculation/control unit 54 is any of 49.95, 49.96, . . . , and 50.04.

Specific processes of the calculation/control unit 54 will later be described with reference to FIG. 3 and FIG. 4.

Descriptions will now be made to a process of the scale 1.

Figure 3:
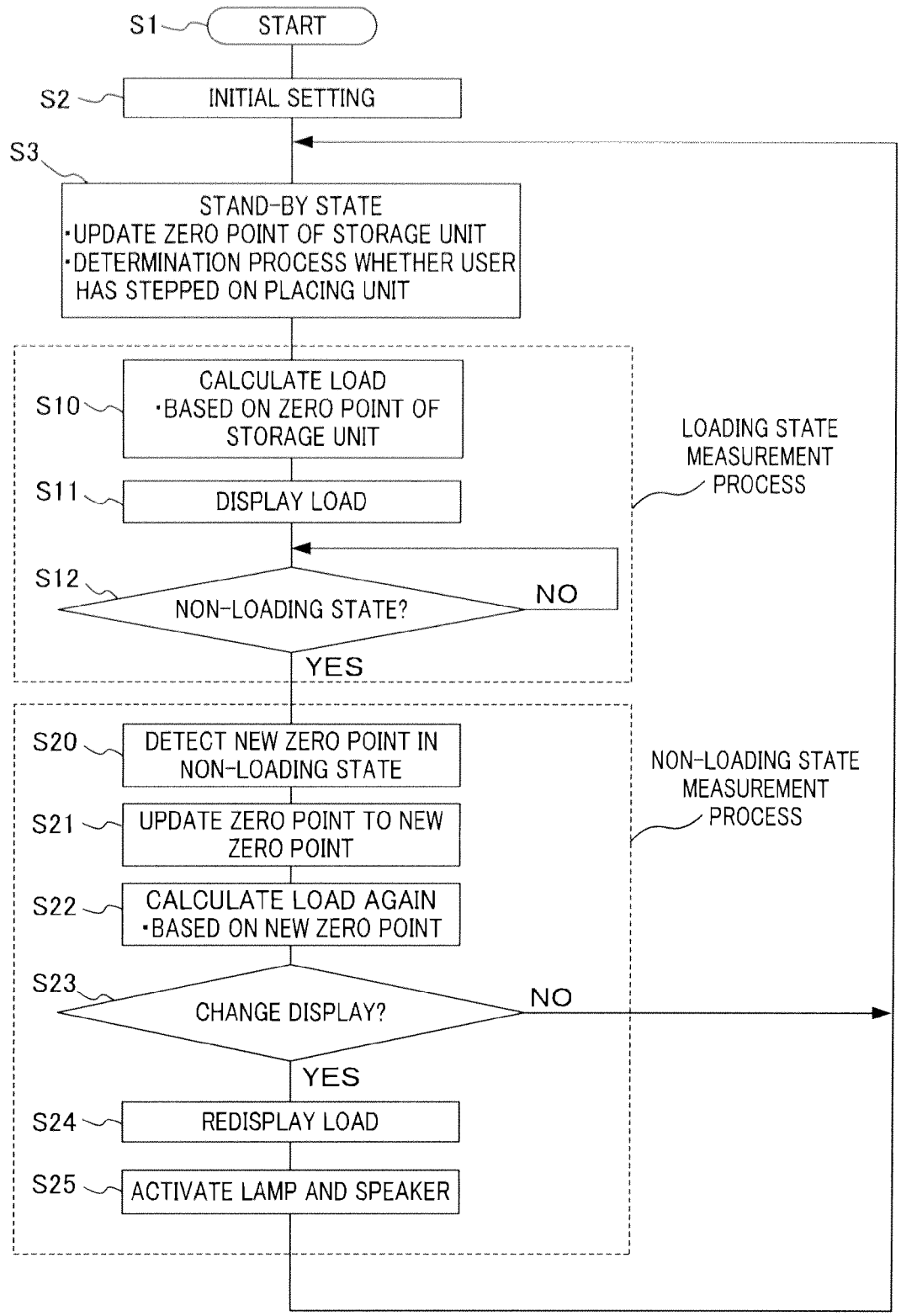
FIG. 3 is a flowchart illustrating a process of the scale 1 of the first embodiment.

FIG. 3 is a flowchart illustrating the process of the scale 1 of the first embodiment.

FIGS. 4A and 4B are diagrams for explaining the load calculation of the first embodiment and a diagram for explaining a display screen of the display unit 20.

First, in Step S (hereinafter referred to as "S"), when the user performs an operation for power activation, such as charging of the battery, the calculation/control unit 54 starts a series of procedures.

In S2, the calculation/control unit 54 accepts an operation for initial setting. In the initial setting, it accepts an input of, for example, date/time.

The calculation/control unit 54 stores the first zero point, based on an output of the load detection unit 50, in the storage unit 53.

The zero point is a value of a load signal when the placing unit 3 is in a non-loading state.

In S3, the calculation/control unit 54 performs a process for a stand-by state. In a stand-by state, there are repeatedly performed an updating process of the zero point and a determination process as to whether the user steps on the placing unit 3, as will specifically be described later.

(1) Updating Process of Zero Point

The calculation/control unit 54 updates the zero point of the storage unit 53 at intervals of specified times (for example, approximately one hour). The zero point updating implies correction of the zero point.

That is, the calculation/control unit 54 rewrites the zero point of the storage unit 53 in a manner that the load calculation value calculated based on an output of the load detection unit 50 will be "0 (kgf)" at this point.

Accordingly, the scale 1 updates the zero point at intervals of specified times even in a non-loading state, thereby enabling to correctly measure the load in S10 to S12, as will be described later.

A determination as to whether the zero point is updated may be based on some standard of whether the peripheral temperature of a provided thermometer is equal to or greater than a standard value, or whether the placement angle of the scale 1 is equal to or lower than a standard value with reference to a provided leveling instrument.

(2) Determination Process of Whether User has Stepped on Placing Unit 3

The calculation/control unit 54 performs a process for determining whether the user is in a state of having stepped on the placing unit 3 (step-on state), at intervals of, for example, two seconds. The calculation/control unit 54 determines whether a load which is greater than a predetermined value (for example, 2 (kgf)) is applied to the placing unit 3, based on the output of the load detection unit 50, thereby determining whether the user has stepped on the placing unit 3.

When it is determined that the user has stepped on the placing unit 3, the calculation/control unit 54 proceeds to S10.

In S10, the calculation/control unit 54 calculates a load calculation value based on the zero point of the storage unit 53, based on the output of the load detection unit 50. The load calculation value which is calculated in a state where the user has stepped on the placing unit 3 is referred to as a "loading state load calculation value."

In S11, the calculation/control unit 54 displays the load display 21 on the display unit 20.

Accordingly, the calculation/control unit 54 calculates and displays the loading state load calculation value based on the zero point of the storage unit 53, thus enabling to inform the user of the weight right after the user has stepped on.

In S12, the calculation/control unit 54 determines whether it is in a non-loading state. The calculation/control unit 54 performs this determination process at intervals of, for example, two seconds.

The non-loading state of S12 is a non-loading state that has shifted from a state where the load is removed from the placing unit 3 from a loading state because the user on the placing unit 3 steps off therefrom.

The calculation/control unit 54 performs this determination based on whether the load calculation value is equal to or lower than a predetermined value (for example, 2 (kgf)). A switch having an electric contact is provided on the bottom surface of the scale 1. The calculation/control unit 54 may perform the determination based on the output of this switch. In this case, the switch may be energized in a manner that it projects from the bottom surface when the user steps off from the placing unit 3 and is turned OFF, while its projection amount is very little when the user steps on the placing unit 3 and it is turned ON.

The calculation/control unit 54 proceeds to S20, when determined that it becomes in a non-loading state (S12: YES). The calculation/control unit 54 repeats the procedure of S12, when determined that is not in non-loading state (S12: NO), that is, when determined that it is in a state where the user has continuously stepped on the placing unit 3.

In S20, the calculation/control unit 54 detects a new zero point. In this embodiment, the new zero point indicates a zero point when it is in a non-loading state, when the user having stepped on the placing unit 3 now steps off from the placing unit 3.

The zero point of the storage unit 53 may differ from the new zero point. This is because the zero point may not be updated right before measurement, even the zero point is updated in the procedure of S3, when the placement environment of the scale 1 has been changed right before measurement. The change of the placement environment may occur when, for example, the scale 1 usually stands, and is put on the level right before measurement, or when the peripheral temperature around the scale 1 has rapidly changed.

In S21, the calculation/control unit 54 updates the zero point of the storage unit 53 to a new zero point.

Then, when the user newly measures the weight, the measurement is accurately performed (S23: No) or due to the procedures repeated in S25 from S3.

In S22, the calculation/control unit 54 calculates the load calculation value again, based on the new zero point. Hereinafter, the load calculation value calculated based on the new zero point is referred to as a "non-loading state load calculation value."

In S23, the calculation/control unit 54 determines whether to redisplay the load display 21 of the display unit 20. The calculation/control unit 54 performs this determination based on whether the load display 21 of the display unit 20 is changed. That is, the calculation/control unit 54 determines whether there is a difference between numerical display (see S11) based on the loading state load calculation value in a state where the user has stepped on the placing unit 3 and numerical display (numerical display in a non-loading state shifted from S12: YES) based on the non-loading state load calculation value in a state where the user has stepped off from the placing unit 3.

This difference between the numerical displays is caused by the difference between the zero point and the new zero point due to the above-described placement environment. Further, the scale 1 is to control the numerical display, as described above.

The scale 1 of this embodiment has a scale interval of 0.1 (kg), as described above. Thus, the calculation/control unit 54 rounds off the value to one decimal place, for example.

As illustrated in FIG. 4A, for example, when the load display 21 is "50.0," the loading state load calculation value is any of 49.95, 49.96, . . . , and 50.04, as illustrated in a display region B1.

There is no need to adjust "50.0" of the load display 21, as long as the non-loading state load calculation value at the new zero point is within the display region B1. Thus, a determination of "NO" is made in S23, that is, the redisplay is not performed. To the contrary, as illustrated in a display region B2, when the non-loading state load calculation value is equal to or lower than 49.94 at the new zero point, or as illustrated in a display region B3, when the non-loading state load calculation value at the new zero point is equal to or greater than 50.05, a determination of "YES" is made in S23, that is, the load display 21 needs to be changed and the redisplay is performed.

For example, as illustrated with an arrow E1 in FIG. 4A, the loading state load calculation value at the zero point of the storage unit 53 is "50.04," and as illustrated with an arrow E2, the non-loading state load calculation value at the new zero point is "49.95." Even in this case, the load display 21 is still "50.0" and is not necessarily changed. Thus, a determination of "NO" is made in S23, that is, the redisplay is not performed.

To the contrary, as illustrated with an arrow E3 in FIG. 4B, when the non-loading state load calculation value at the new zero point is "50.05," the calculation/control unit 54 rounds off this value and assumes as "50.1." The load display 21 of the display unit 20 needs to be changed. Thus, a determination of "YES" is made in S23, that is, the redisplay is performed.

Accordingly, a determination of the redisplay may be made in S23 based on whether there is a difference between the numerical value to be displayed on the display unit 20 as a loading state load calculation value and a numerical value to be displayed on the display unit 20 as a non-loading state load calculation value.

When it is determined that the load display 21 is redisplayed (S23: YES), the calculation/control unit 54 proceeds to S24. On the other hand, when it is determined that the load display 21 is not redisplayed (S23: NO), the calculation/control unit 54 turns off the display of the display unit 20 after elapse of several minutes, and repeats the procedures from S3.

In the above-described example, the determination to perform the redisplay is made in S23, when there is a difference of even one scale interval between the numerical value to be displayed on the display unit 20 as a loading state load calculation value and a numerical value to be displayed on the display unit 20 as a non-loading state load calculation value. However, as a modification, a determination to perform the redisplay may be made in S23, when there is a difference, equal to or greater than a provided threshold value, between the numerical value to be displayed on the display unit 20 as a loading state load calculation value and the numerical value to be displayed on the display unit 20 as a non-loading state load calculation value.

Specifically, for example, as illustrated in FIG. 4A, when the load display 21 is "50.0," and when the threshold value is set as "two scale interval," a determination not to perform the redisplay is made in S23, even if the non-loading state load calculation value at the new zero point is equal to or greater than "49.85" or equal to or lower than "50.14."

As the above example, the same process is performed for determining not to perform the redisplay (NO in S23), when the non-loading state load calculation value at the new zero point is equal to or greater than "49.95" or equal to or lower than "50.04." However, in this modification, the determination not to perform the redisplay is made (NO in S23), even when the non-loading state load calculation value at the new zero point is equal to or greater than "49.85" or equal to lower than "49.94" and equal to or greater that "50.05" or equal to or lower than "50.14." That is, when the non-loading state load calculation value at the new zero point is equal to or greater than "49.85" or equal to or lower than "49.94," the numerical value to be displayed on the display unit 20 is 49.9 kg. When the value is equal to or greater than "50.05" or equal to or lower than "50.14," the numerical value to be displayed on the display unit 20 is 50.1 kg. Thus, there is a 0.1 kg (one scale interval) difference from the numerical value (50.0 kg) to be displayed on the display unit 20 as the loading state load calculation value. This value is lower than the set threshold value (=two scale interval), and a determination not to perform the redisplay is made in S23.

When the non-loading state load calculation value at the new zero point is equal to or lower than "49.84" or equal to or greater than "50.15," a determination as to whether to perform the redisplay is made (YES in S23). That is, when the non-loading state load calculation value at the new zero point is equal to or lower than "49.84," the numerical value to be displayed on the display unit 20 is equal to or lower than 49.8 kg, and when the value is equal to or greater than "50.15," the numerical value to be displayed on the display unit 20 is equal to or greater than 50.2 kg. Thus, there is a 0.2 kg (=two scale interval) or greater difference from the numerical value (50.0 kg) to be displayed on the display unit 20 as the loading state load calculation value. This value is equal to or greater than a set threshold value, and a determination not to perform the redisplay is made in S23.

In this modification, for the convenience sake of descriptions, the descriptions have been made only to the case in which the threshold value is set as "two scale interval." However, needless to say, the threshold value is not limited to this, and may arbitrarily be set.

Accordingly, by setting the threshold value, it is possible to appropriately skip the redisplay process by the scale 1.

In S24, as illustrated in FIG. 4B, the calculation/control unit 54 redisplays the load display 21, based on the re-calculated non-loading state load calculation value.

In S25, the calculation/control unit 54 activates the light emitting device 31 and the sound output device 32 for a few seconds. For example, the calculation/control unit 54 turns on and off the light emitting device 31, and outputs a warning sound "beep" from the sound output device 32.

As a result, the scale 1 can announce the user that the load display 21 has been redisplayed, based on the new zero point.

After this, the calculation/control unit 54 turns off the display of the display unit 20 after elapse of several minutes, and repeats the procedures from S3.

By the procedures from S20 to S25 (process for measuring a non-loading state), the scale 1 can announce the user of the accurate weight.

As described above, when the user has stepped on the placing unit 3, the scale 1 of this embodiment announces the user of the weight based on the zero point which has been set in advance. After this, when it is in the non-loading state, the scale can announce the user of the accurate weight. It is possible to calculate an accurate measurement result, without going through further measurement.

(Second Embodiment)

Descriptions will now be made to the second embodiment of the present invention.

In the descriptions and drawings below, the same reference numerals or the same last two figures of a number are appropriately given to those having the same functions as those of the above-described first embodiment, and the same functions will not be described repeatedly again.

FIGS. 5A and 5B are diagrams for explaining load calculation of the second embodiment.

In this embodiment, what differs from the first embodiment is only a determination process (see S23 in FIG. 3) as to whether the load display of the display unit is to be redisplayed.

As illustrated in FIG. 5A, a control unit (see a calculation/control unit 54 in FIG. 2) of this embodiment performs the determination process based on a difference d22 between a loading state load calculation value C21 (a load of loading state) based on a zero point A21 of a storage unit (see a storage unit 53 in FIG. 2) and a non-loading state load calculation value C22 (a load of non-loading state) based on a new zero point A22.

When the absolute value of the difference d22 is equal to or greater than a predetermined value, load display of a display unit is redisplayed (see YES in S23 in FIG. 3). To the contrary, when the absolute value thereof is lower than the predetermined value, the load display of the display unit is not redisplayed (see NO in S23 in FIG. 3).

FIG. 5B is another example of this embodiment.

In the example of FIG. 5B, the control unit performs a determination process as to whether the load display of the display unit is to be redisplayed, based on whether the absolute value of a difference d32 between a zero point A31 of the storage unit and a new zero point A32 is equal to or greater than a predetermined value.

Even in the above configuration, like the first embodiment, the scale of this embodiment can announce the user of the weight, both in a loading state where the user has stepped on a placing unit and in a non-loading state where the user has stepped off from the placing unit.

(Third Embodiment)

Descriptions will now be made to a third embodiment of the present invention.

FIG. 6 is a flowchart illustrating a process of a scale of the third embodiment.

In the above-described first and second embodiments, after a load calculation value (a loading state load calculation value) is calculated based on the zero point of the storage unit 53, this loading state load calculation value is displayed on the display unit 20 (see S11 in FIG. 3). However, in this embodiment, display right after calculation of the loading state load calculation value is skipped, and the flow shifts to a determination process as to whether it is in a non-loading state (S10 to S12 in FIG. 6).

In this embodiment, displayed on the display unit 20 is a load calculation value (a non-loading state load calculation value) calculated based on the zero point in a non-loading state in S22, without determining (see S23 in FIG. 3) as to whether the redisplay is performed or not (S324). In this case, the load calculation value which has been displayed once is not redisplayed. Though there is almost no need to announce the user of the display by activation of a lamp speaker (see S25 in FIG. 3), this announcement can be performed.

Accordingly, it may be enough to display the load calculation value (the non-loading state load calculation value) calculated based on the zero point in a non-loading state on the display unit 20 after the user has stepped off from the placing unit 3. In this case, the process may be simplified by skipping some procedures, such as performing the display right after calculation of the loading state load calculation value and a determination as to whether redisplay is to be performed.

(Fourth Embodiment)

Descriptions will now be made to a fourth embodiment of the present invention.

Figure 7A:
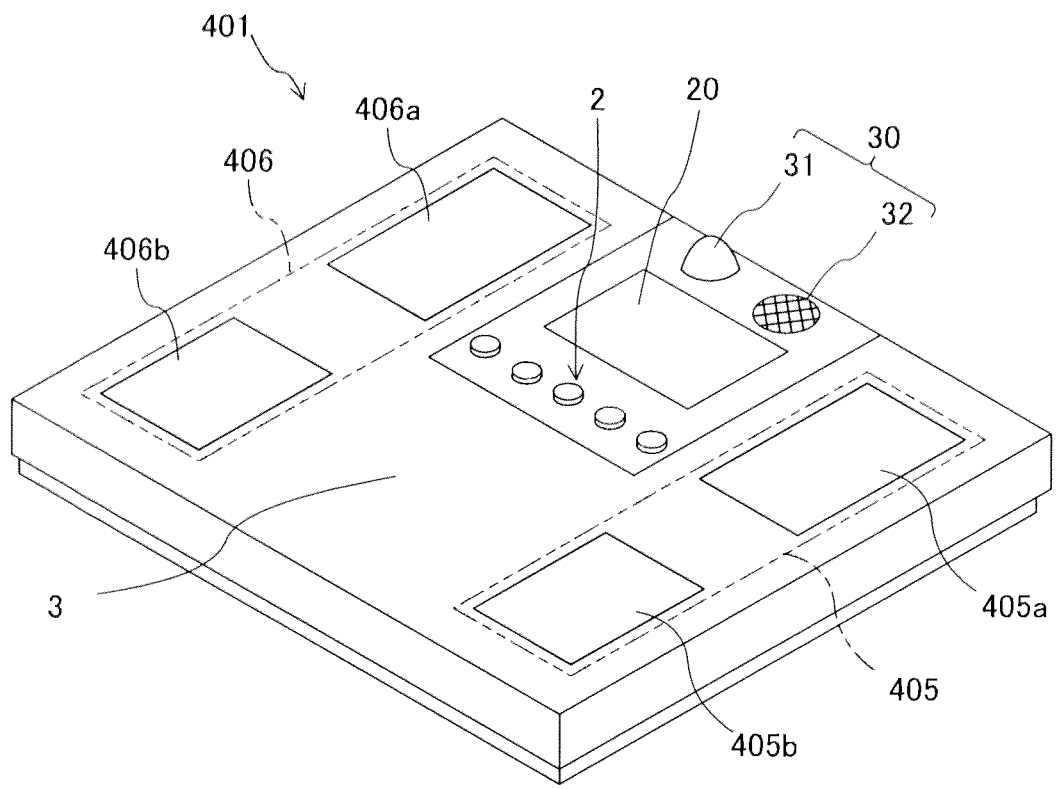
FIGS. 7A and 7B are diagrams for explaining a body composition meter 401 of a fourth embodiment.
Figure 7B:
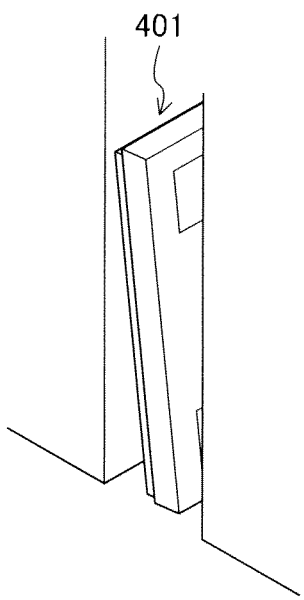

FIGS. 7A and 7B are diagrams for explaining a body composition meter 401 of the fourth embodiment.

FIGS. 8A and 8B are a block diagram of the body composition meter 401 of the fourth embodiment and a diagram for explaining a user information storage unit 453c.

This embodiment is to specify a user using a measured weight (load) and biological impedance (measurement biological impedance), while the latest (last) measurement value of the user (subject) is stored.

FIG. 7A is a perspective diagram of the body composition meter 401 (a biological measurement apparatus). The body composition meter 401 can be put and stand against the wall, as illustrated in FIG. 7B.

The body composition meter 401 includes an operation unit 2, a placing unit 3, a display unit 20, an annunciator unit 30, a right-foot placing unit 405, and a left-foot placing unit 406.

The right-foot placing unit 405 and the left-foot placing unit 406 are provided on the outer surface of the placing unit 3, and parts on which the user places his/her right and left feet respectively. The right-foot placing unit 405 and the left-foot placing unit 406 include current application electrodes 405a and 406a (electrode members) and voltage measurement electrodes 405b and 406b (electrode members). The current application electrodes 405a and 406a and the voltage measurement electrodes 405b and 406b are arranged in positions with which the user's feet are in contact, in a state where the user puts his/her feet on the placing unit 3.

The current application electrodes 405a and 406a are electrodes that apply a current. The voltage measurement electrodes 405b and 406b are electrodes that measure the voltage, and output an analog signal representing a voltage measurement value.

As illustrated in FIG. 8A, the body composition meter 401 includes a power source 40, a clocking unit 41, a load detection unit 50, a load measurement circuit 51, a storage unit 453, a calculation/control unit 454, and a biological impedance measurement circuit 460, in addition to the above-described hardware.

In the present invention, a computer implies an information processing unit which includes a storage device and a control device. The body composition meter 401 is an information processing unit which includes the storage unit 453 and the calculation/control unit 454, and is included in the concept of the computer of the present invention.

The storage unit 453 is formed of a storage device, such as a semiconductor memory, and stores information necessary for operating the body composition meter 401. The storage unit 453 stores a weight measurement program 453a, a zero point storage unit 453b, and a user information storage unit 453c.

The weight measurement program 453a is a program for performing a process illustrated in FIG. 9, as will be described later.

The zero point storage unit 453b stores a zero point.

The user information storage unit 453c stores a user-specified image, name, color, data (physical data) (sex, a birth-year, a height, and life-strength), and the latest measurement value.

FIG. 8B illustrates an example of the user information storage unit 453c. Before the first measurement and before stepping on the placing unit 3 of the body composition meter 401, the user specifies the number, image, name, and color through operation of the operation unit 2, registers the sex information, the birth-year, the height, and the life-strength. As the weight (a load calculation value) and the biological impedance, the latest measurement values are registered after the measurement. The user information storage unit 453c may register various data of a measurement result, a user's nickname, an image, a color, and life-strength, in addition to these information items.

The calculation/control unit 454 is formed of a CPU, and appropriately reads the various programs stored in the storage unit 453, thereby executing various functions.

The calculation/control unit 454 calculates the load, displays it on the display unit 20, and also calculates biological impedance (Ω) based on the voltage measurement value output by the voltage measurement electrodes 405b and 406b through the biological impedance measurement circuit 460. The calculation/control unit 454 performs a process for specifying a user registered in the user information storage unit 453c, based on the load and the biological impedance as measurement values. The calculation/control unit 454 calculates body composition data (data regarding physical composition), such as the body fat percentage, based on the measurement values and data of the specified user (user information).

The biological impedance measurement circuit 460 applies a high frequency current of a particular frequency, between the current application electrodes 405a and 406a. The biological impedance measurement circuit 460 measures a voltage between the voltage measurement electrodes 405b and 406b, that is, a voltage caused by the biological impedance between both feet of the user, converts an analog signal of the voltage measurement value into a digital signal, and outputs it to the calculation/control unit 454.

Descriptions will now be made to a process of the body composition meter 401.

Figure 9:
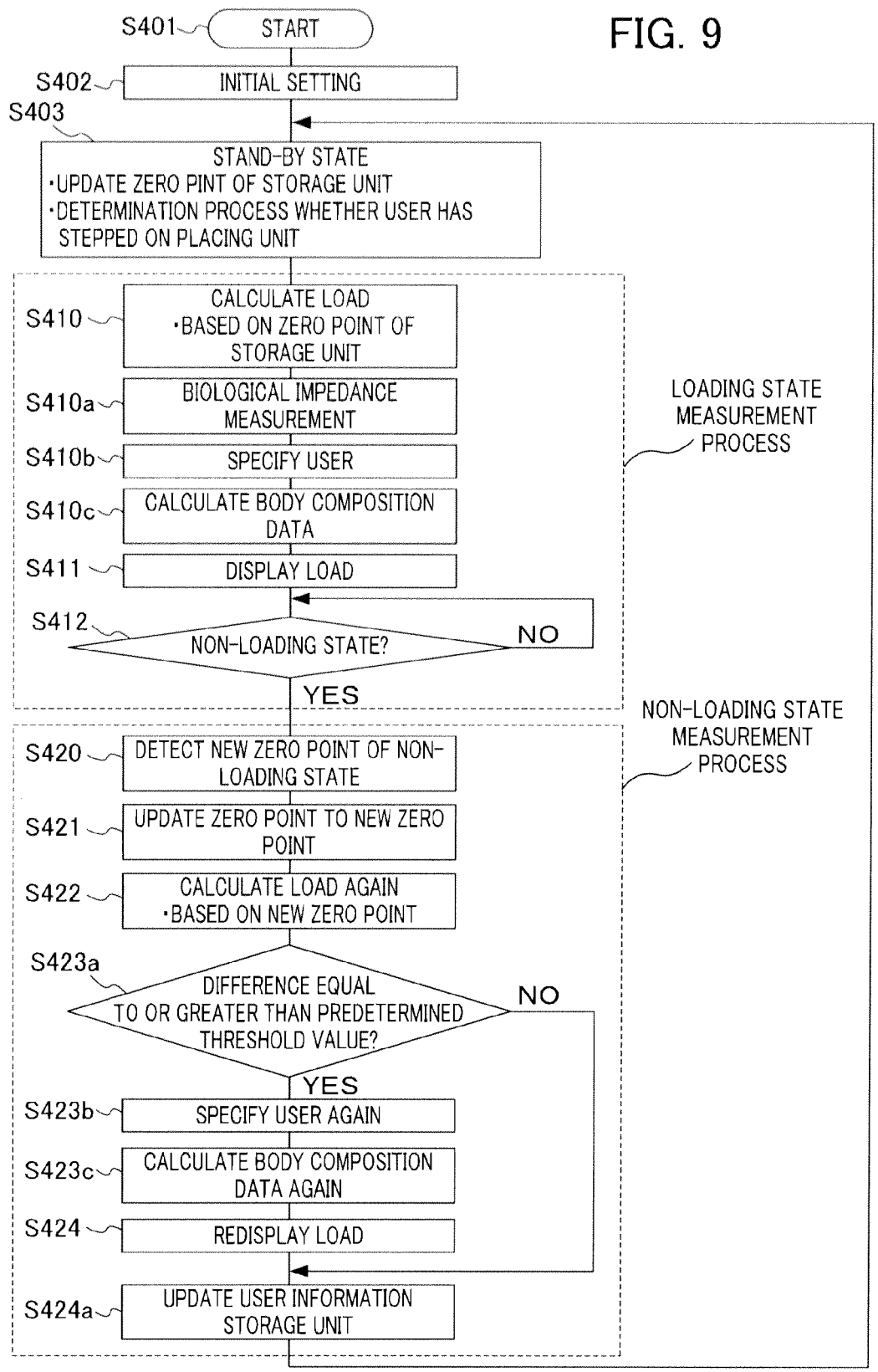
FIG. 9 is a flowchart illustrating a process of the body composition meter 401 of the fourth embodiment.

FIG. 9 is a flowchart illustrating a process of the body composition meter 401 of the fourth embodiment.

Procedures from S401 to S410 are the same as the procedures from S1 to S10 of FIG. 3 in the first embodiment. As described above, in S402, as initial setting, the calculation/control unit 454 accepts specifications of a user number, image, name, and color, and also inputs of sex, a birth-year, a height, and life-strength, in addition to, for example, an input of a date/time.

In S410a, the calculation/control unit 454 instructs the biological impedance measurement circuit 460 for activation, to activate the biological impedance measurement circuit 460 and measure the biological impedance.

In S410b, the calculation/control unit 454 specifies a record of the user information storage unit 453c which stores the approximate weight and the biological impedance, based on the measured biological impedance (measurement biological impedance) and the loading state load calculation value calculated in S410. The "approximate" implies that, for example, the weight is in a range of ±X kg, while the biological impedance is in a range of ±YΩ (X and Y are arbitrary numbers and may appropriately be set). At the first measurement after the user initial setting in S402, the user information storage unit 453c does not register the weight and the biological impedance therein. However, upon operation of the operation unit 2, the user is specified.

In S410c, the calculation/control unit 454 calculates body composition data, using data representing the sex, birth-year, height, and life-strength corresponding to the specified record, the measured loading state load calculation value, and the biological impedance. The body composition data includes, for example, BMI (Body Mass Index), body fat percentage, muscle mass, bone mass, and basal metabolic rate.

In S411, the calculation/control unit 454 performs load display on the display unit 20, based on the loading state load calculation value. The calculation/control unit 454 displays a number specifying the user, an image, a name, a color, and body composition data calculated using a loading state load calculation value, on the display unit 20.

Procedures of S412 and from S420 to S422 are the same as those of S12 and from S20 to S22 of FIG. 3 of the first embodiment. As illustrated in FIG. 7B, if the body composition meter 401 is put and stood against the wall, the zero point stored in the zero point storage unit 453b is very likely to be different from a new zero point.

In S423a, the calculation/control unit 454 determines whether a difference of loads is equal to or greater than a predetermined threshold value. The predetermined threshold value is referred when there is a difference between, for example, the numerical value displayed on the display unit 20 as a loading state load calculation value and the numerical value to be displayed on the display unit 20 as a non-loading state load calculation value. When the difference of the loads is equal to or greater than the threshold value (S423a: YES), the calculation/control unit 454 moves the process to S423b. To the contrary, when the difference of the loads is not equal to or greater than the threshold value (S423a: NO), the calculation/control unit 454 moves the process to S424a.

In S423b, the calculation/control unit 454 specifies again a record of the user information storage unit 453c which stores the approximate weight and the biological impedance, based on the measured biological impedance and the non-loading state load calculation value calculated in S422. The calculation/control unit 454 may announce that it is still in calculation on the display unit 20, to let the user stand by while performing this process.

In S423c, the calculation/control unit 454 calculates again body composition data, such as the body fat percentage, based on the data representing the sex in the re-specified record, birth-year, height, and life-strength, the measured non-loading state load calculation value, and the biological impedance.

In S424, the calculation/control unit 454 performs the load display on the display unit 20 based on the non-loading state load calculation value. The calculation/control unit 454 displays, on the display unit 20, the user-specifying number, image, name, and color, and also the body composition data calculated using the non-loading state load calculation value.

In S424a, the calculation/control unit 454 updates the weight in the specified record of the user information storage unit 453c and the biological impedance, to the non-loading state load calculation value and the measured biological impedance.

Accordingly, even when the accurate value is not stored at the zero point, because the body composition meter 401 is stood against the wall or is stored with other articles put thereon, the body composition meter 401 detects that the zero point when it is in the non-loading state shifted from the loading state, and re-calculates the load at the new zero point. The body composition meter 401 can measure the accurate load regardless of its storage state.

The body composition meter 401 can specify a user based on the load calculation value and the biological impedance, using the user information storage unit 453c. In this case, if the loading state load calculation value and the non-loading state load calculation value are lower than a predetermined threshold value, there is no need to perform a process for specifying the user. Hence the body composition meter 401 can cut down the time for displaying the load. There has been made the determination as to whether the difference between the loading state load calculation value and the non-loading state load calculation value is equal to or greater than a predetermined threshold value, by way of example. The predetermined value may arbitrarily be set. For example, there may be made a determination as to whether there is a difference between the record of the user information storage unit 453c which is specified again using the non-loading state load calculation value and the record specified in the loading state. When there is the difference therebetween, the body composition data may be calculated again.

The calculation/control unit 454 has been described as a unit that measures the biological impedance in the loading state measurement process. However, it may measure the impedance in the non-loading state measurement process. Note that the biological impedance is not to be changed, depending on the load. Thus, it is possible to cut down the time for display, if the value measured in the loading state measurement process is used.

(Fifth Embodiment)

Descriptions will now be made to a fifth embodiment of the present invention.

Figure 10:
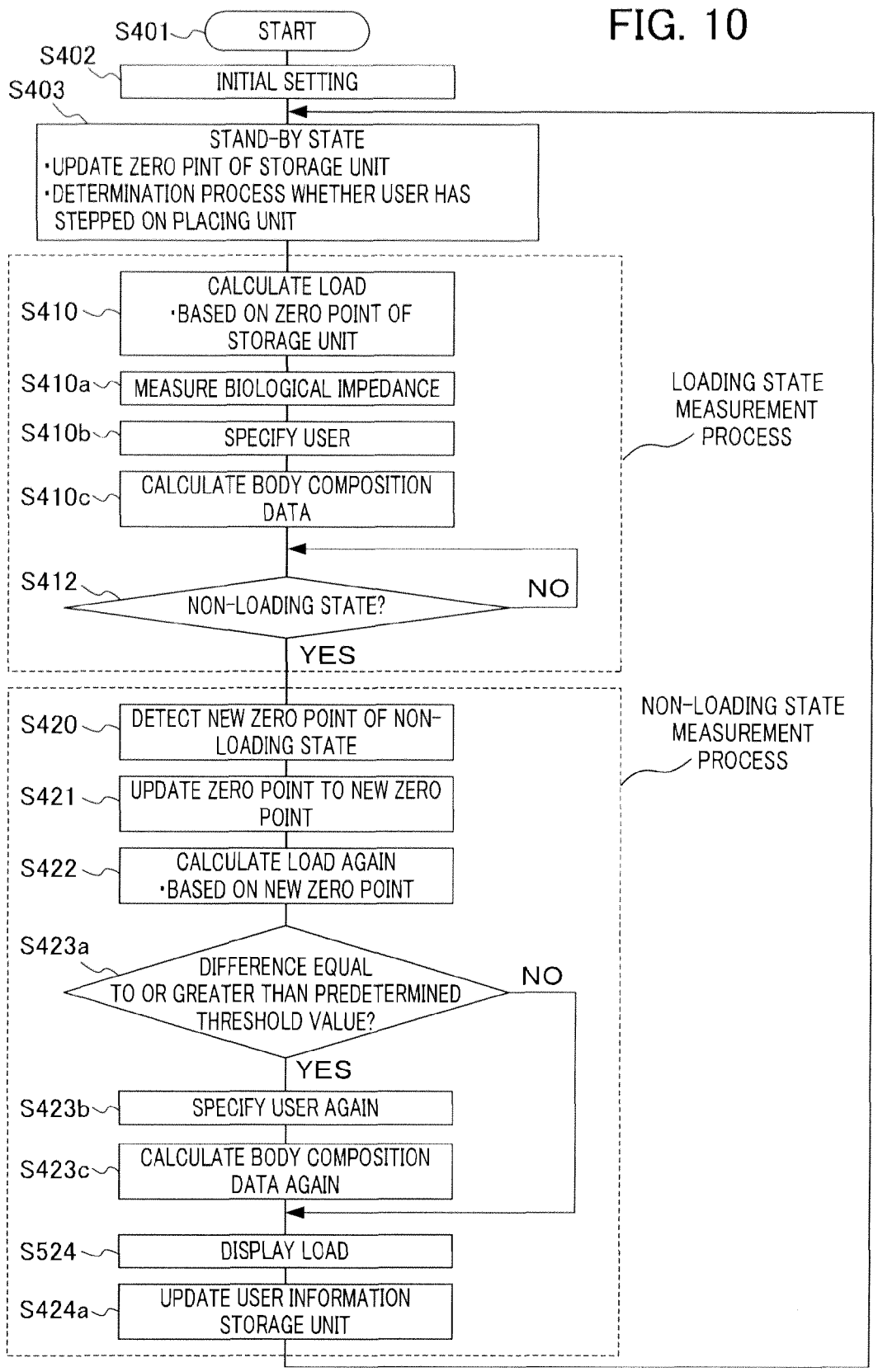
FIG. 10 is a flowchart illustrating a process of a body composition meter of a fifth embodiment.

FIG. 10 is a flowchart illustrating a process of a body composition meter of the fifth embodiment.

In the above-described fourth embodiment, after a load calculation value (a loading state load calculation value) is calculate using a zero point of a zero point storage unit 453b as a standard value, this loading state load calculation value is displayed on a display unit 20 (see S411 of FIG. 9). However, in this embodiment, display after calculation of the loading state load calculation value is skipped, and the flow moves to a determination process as to whether it is in the non-loading state (from S410c to S412 of FIG. 10).

In this embodiment, a load calculation value (a non-loading state load calculation value) is displayed on the display unit 20 (S524). This value is calculated using the zero point in the non-loading state as a standard in S422. A calculation/control unit displays, on the display unit 20, a user-specifying number, image, name, and color, and also the latest calculated body composition data (S524).

As described above, after a user steps off from the placing unit 3, if it is enough to display a measurement result on the display unit 20, the display may be skipped right after calculation of the loading state load calculation value, for the sake of simple process.

The embodiments of the present invention have been described. The present invention is not limited to these embodiments. Like the below modification, various modifications or changes may be made thereto, and are within the technical scope of the present invention. Those effects of the embodiments simply specify the most suitable effects resulting from the present invention. Thus, the effects of the present invention are not limited to those described in the embodiments. The above-described embodiments and the below modification may suitably combined together, and will not specifically be described.

(Modification)

(1) In this embodiment, the weight measurement apparatus has been described as a scale by way of example, but is not limited to this example. For example, the weight measurement apparatus may measure any objects other than human bodies. The weight measurement apparatus may be an apparatus for industrial use in plants or factories.

(2) In the embodiments, the weight measurement apparatus and the biological measurement apparatus have been described as apparatuses that are formed integrally, but are not limited to this example. For example, in the weight measurement apparatus and the biological measurement apparatus, a detection unit having a load detection unit is provided separately from a computer (a personal computer and a mobile information terminal) having a control unit, and these are connected with each other by wire or wirelessly. In this case, weight measurement programs 53a and 453a may be provided, for example, in a server, and downloaded into a computer through a communication network, such as the Internet.

(3) In the embodiments, the scale is one that displays only the weight, by way of example, but is not limited to this. The scale may have a function for calculating information regarding the body fat percentage or any other physical compositions. For example, when the body fat percentage is to be measured, the detection unit (electrode) is provided in the scale, while the control unit calculates the biological impedance based on an output from the detection unit. Further, the body fat percentage may be calculated based on the biological impedance and the weight, and then displayed on the display unit.

(4) In the embodiments, what are so-called a step-on scale and a body composition meter are described by way of example. The determination has been made as to whether loading of specified load (for example, 2 (kgf)) is applied to the placing unit 3, based on the output of the load detection unit 50, thereby performing the determination process for determining as to whether the user has stepped on the placing unit 3. This enables to perform measurement, only if the user steps on the placing unit, without consciously performing a switch operation for starting the measurement. However, the step-on system is not limited to the above, and various systems are applicable. For example, a detection unit (electrode) is provided in the scale, while the control unit calculates the biological impedance based on the output from this detection unit, and then there is performed a process for determining whether the user has stepped on the placing unit 3 based on a change in the calculated biological impedance. There is no need to always adopt the step-on system. It may be a weighting device or a scale and a body composition scale that starts measurement upon user operation consciously on a switch for starting the measurement, and that updates the zero point at predetermined time intervals during nonuse.

(5) In the embodiments, the scale and the body composition meter adopt the load (kgf) as display of the weight (kg), by way of example, but are not limited to this. When the weight is accurately displayed as mass, the control unit may calculate a load signal (kgf and N) of the load from the load detection unit, as a mass calculation value which is a numerical value converted into mass (kg). In this case, the control unit may simply perform the same process as that for displaying the load in the embodiments, for displaying the mass based on the mass calculation value. In this case, the same effects as those in the embodiments are realized.

(6) In the embodiments, the descriptions have been made, for example, to the body composition scale which specifies the user. However, a scale which specifies the user is also applicable. In this case, the storage unit of the scale may have a user information, and the user may be specified based only on the load.

(7) In the embodiments, the body composition meter has been described as an example of specifying the user, using the user information storage unit which stores the latest measurement values, but this meter is not limited to this. For example, the measurement values of the past several times (for example, five times) may be stored in the user information storage unit, and the user may be specified using them.

(8) In the embodiments, the body composition meter has been described as an example of specifying the user based on the load and the biological impedance, but the meter is not limited to this. The user may be specified using body composition data calculated based on the load and the biological impedance.

(9) In the embodiments, the body composition meter has been described as an example of measuring the biological impedance using current application electrodes and voltage measurement electrodes provided in a part with which the soles of the feet of the user are in contact. However, the meter is not limited to this. Not only the feet of the user, but also the biological impedance between at least two body parts of the user may be measured by a body composition meter.

(10) In the embodiments 3 and 5, in a possible configuration, right after the calculation of the loading state load calculation value, this calculated value is displayed as a "reference value." After this, in Step S324 (or S524), the non-loading state load calculation value is displayed as a measurement result.

REFERENCE SIGNS LIST

1 Scale
2 Operation Unit
3 Placing Unit
20 Display Unit
21 Load Display
30 Annunciator Unit
31 Light Emitting Device
32 Sound Output Device
40 Power Source
41 Clocking Unit
50 Load Detection Unit
51 Load Measurement Circuit
53, 453 Storage Unit
53a, 453a Weight Measurement Program
54, 454 Calculation/Control Unit
401 Body Composition Unit
405 Right-Foot Placing Unit
406 Left-Foot Placing Unit
453b Zero Point Storage Unit 453c User Information Storage Unit
460 Biological Impedance Measurement Circuit

What is claimed is:
1. A weight measurement apparatus comprising:
load detection circuitry configured to detect a load to a loading unit;
storage circuitry configured to store a first zero point in advance;
control circuitry configured to calculate a first load calculation value and a second load calculation value using a load signal corresponding to the load to the loading unit based on an output of the load detection circuitry; and
display circuitry configured to display at least one of the first load calculation value and/or the second load calculation value,
wherein the control circuitry is configured to calculate a loading state load calculation value as the first load calculation value which is calculated based on the load signal in a loading state and the first zero point of the storage circuitry, wherein the load is applied to the loading unit in the loading state,
wherein the control circuitry is configured to calculate a non-loading state load calculation value as the second load calculation value which is calculated based on the load signal in the loading state and the load signal in a non-loading state wherein the load is removed from the loading unit in the non-loading state and after the loading state,
wherein the control circuitry is configured to display the loading state load calculation value calculated in the loading state on the display circuitry, and is configured to redisplay the non-loading state load calculation value calculated in the non-loading state on the display circuitry, and
wherein the control circuitry is configured to determine whether to redisplay the non-loading state load calculation value calculated in the non-loading state on the display circuitry in accordance with a determination result regarding a difference between the first zero point stored in advance in the storage circuitry and a second zero point in the non-loading state.

2. The weight measurement apparatus according to claim 1, further comprising annunciator circuitry configured to perform announcement for a user, wherein the control circuitry activates the annunciator circuitry when the non-loading state load calculation value calculated in the non-loading state is redisplayed on the display circuitry.

3. The weight measurement apparatus according to claim 1, wherein the control circuitry updates the first zero point stored in advance in the storage circuitry to the second zero point in the non-loading state, and stores the second zero point.

4. A weight measurement apparatus comprising:
load detection circuitry configured to detect a load to a loading unit;
storage circuitry configured to store a first zero point in advance;
control circuitry configured to calculate a first load calculation value and a second load calculation value using a load signal corresponding to the load to the loading unit based on an output of the load detection circuitry; and
display circuitry configured to display at least one of the first load calculation value and/or the second load calculation value in a numerical value,
wherein the control circuitry is configured to calculate a loading state load calculation value as the first load calculation value which is calculated based on the load signal in a loading state and the first zero point of the storage circuitry, wherein the load is applied to the loading unit in the loading state,
wherein the control circuitry is configured to calculate a non-loading state load calculation value as the second load calculation value which is calculated based on the load signal in the loading state and the load signal in a non-loading state wherein the load is removed from the loading unit in the non-loading state and after the loading state,
wherein the control circuitry is configured to display the loading state load calculation value calculated in the loading state on the display circuitry, and
wherein, when there is a difference between a first numerical value to be displayed on the display circuitry as the loading state load calculation value and a second numerical value to be displayed on the display circuitry as the non-loading state load calculation value, the control circuitry is configured to redisplay the non-loading state load calculation value calculated in the non-loading state on the display circuitry,
wherein, when there is no difference between the first numerical value to be displayed on the display circuitry as the loading state load calculation value and the second numerical value to be displayed on the display circuitry as the non-loading state load calculation value, the control circuitry does not redisplay the non-loading state load calculation value calculated in the non-loading state on the display circuitry.

5. A weight measurement apparatus comprising:
load detection circuitry configured to detect a load to a loading unit;
storage circuitry configured to store a first zero point in advance;
control circuitry configured to calculate a first load calculation value and a second load calculation value using a load signal corresponding to the load to the loading unit based on an output of the load detection circuitry; and
display circuitry configured to display at least one of the first load calculation value and/or the second load calculation value in a numerical value,
wherein the control circuitry is configured to calculate a loading state load calculation value as the first load calculation value which is calculated based on the load signal in a loading state and the first zero point of the storage circuitry, wherein the load is applied to the loading unit in the loading state,
wherein the control circuitry is configured to calculate a non-loading state load calculation value as the second load calculation value which is calculated based on the load signal in the loading state and the load signal in a non-loading state wherein the load is removed from the loading unit in the non-loading state and after the loading state,
wherein the control circuitry is configured to display the loading state load calculation value calculated in the loading state on the display circuitry,
wherein, when a difference between a first numerical value to be displayed on the display circuitry as the loading state load calculation value and a second numerical value to be displayed on the display circuitry as the non-loading state load calculation value is equal to or greater than a predetermined threshold value, the control circuitry is configured to redisplay the non-loading state load calculation value calculated in the non-loading state on the display circuitry, wherein, when the difference between the first numerical value to be displayed on the display circuitry as the loading state load calculation value and the second numerical value to be displayed on the display circuitry as the non-loading state load calculation value is less than the predetermined threshold value, the control circuitry does not redisplay the non-loading state load calculation value calculated in the non-loading state on the display circuitry.

6. A weight measurement apparatus comprising:

load detection circuitry configured to detect a load to a loading unit;

storage circuitry configured to store a first zero point in advance;

control circuitry configured to calculate a first load calculation value and a second load calculation value using a load signal corresponding to the load to the loading unit based on an output of the load detection circuitry; and display circuitry configured to display at least one of the first load calculation value and/or the second load calculation value, wherein the control circuitry is configured to calculate a loading state load calculation value as the first load calculation value which is calculated based on the load signal in a loading state and the first zero point of the storage circuitry, wherein the load is applied to the loading unit in the loading state, wherein the control circuitry is configured to calculate a non-loading state load calculation value as the second load calculation value which is calculated based on the load signal in the loading state and the load signal in a non-loading state wherein the load is removed from the loading unit in the non-loading state and after the loading state, wherein the control circuitry is configured to display the loading state load calculation value calculated in the loading state on the display circuitry, and is configured to redisplay the non-loading state load calculation value calculated in the non-loading state on the display circuitry, and wherein the control circuitry determines whether to redisplay the non-loading state load calculation value calculated in the non-loading state on the display circuitry, in accordance with a determination result regarding a difference between the loading state load calculation value and the non-loading state load calculation value.

7. A weight measurement apparatus comprising:

load detection circuitry configured to detect a load to a loading unit;

storage circuitry configured to store a first zero point in advance;

control circuitry configured to calculate a first load calculation value and a second load calculation value using a load signal corresponding to the load to the loading unit based on an output of the load detection circuitry; and display circuitry configured to display at least one of the first load calculation value and/or the second load calculation value, wherein the control circuitry is configured to calculate a loading state load calculation value as the first load calculation value which is calculated based on the load signal in a loading state and the first zero point of the storage circuitry, wherein the load is applied to the loading unit in the loading state, wherein the control circuitry is configured to calculate a non-loading state load calculation value as the second load calculation value which is calculated based on the load signal in the loading state and the load signal in a non-loading state and display the non-loading state load calculation value on the display circuitry, wherein the load is removed from the loading unit in the non-loading state and after the loading state, and wherein the control circuitry updates the first zero point stored in advance in the storage circuitry to a stand-by zero point in a stand-by state based on the load signal in the stand-by state and stores the stand-by zero point when a peripheral temperature difference is equal to or greater than a reference value, wherein the weight measurement apparatus is not used in the stand-by state.

8. A weight measurement apparatus comprising:

load detection circuitry configured to detect a load to a loading unit;

storage circuitry configured to store a first zero point in advance;

control circuitry configured to calculate a first load calculation value and a second load calculation value using a load signal corresponding to the load to the loading unit based on an output of the load detection circuitry; and display circuitry configured to display at least one of the first load calculation value and/or the second load calculation value, wherein the control circuitry is configured to calculate a loading state load calculation value as the first load calculation value which is calculated based on the load signal in a loading state and the first zero point of the storage circuitry, wherein the load is applied to the loading unit in the loading state, wherein the control circuitry is configured to calculate a non-loading state load calculation value as the second load calculation value which is calculated based on the load signal in the loading state and the load signal in a non-loading state and display the non-loading state load calculation value on the display circuitry, wherein the load is removed from the loading unit in the non-loading state and after the loading state, wherein the storage circuitry includes user information storage circuitry which stores user information including a stored load calculation value and user identification information in association with each other, wherein the control circuitry is configured to specify the user identification information corresponding to the first load calculation value approximated to the loading state load calculation value calculated in the loading state based on the user information storage circuitry, wherein the control circuitry is configured to specify the user identification information corresponding to the second load calculation value approximated to the non-loading state load calculation value based on the user information storage circuitry when there is a difference between the non-loading state load calculation value and the loading state load calculation value and when the difference between the non-loading state load calculation value and the loading state load calculation value calculated in the non-loading state is equal to or greater than a predetermined threshold, and wherein the control circuitry is configured to display lately specified user identification information on the display circuitry.

9. The weight measurement apparatus according to claim 8, wherein the control circuitry updates the stored load calculation value corresponding to the lately specified user identification information stored in the user information storage circuitry to the non-loading state load calculation value, and stores the non-loading state load calculation value.

10. A biological measurement apparatus comprising:
load detection circuitry configured to detect a load to a loading unit;
a plurality of electrode members configured to be arranged to be in contact with a user;
zero point storage circuitry configured to store a zero point in advance;
user information storage circuitry configured to store user information including a stored load calculation value, biological impedance, and user identification information in association with each other;
control circuitry configured to calculate a first load calculation value and a second load calculation value using a load signal corresponding to the load to the loading unit based on an output of the load detection circuitry; and
display circuitry configured to display at least one of the first load calculation value and/or the second load calculation value,
wherein, in a loading state where the load is applied to the loading unit, the control circuitry is configured to
calculate a loading state load calculation value as the first load calculation value which is calculated based on the load signal in the loading state and the zero point of the zero point storage circuitry,
calculate measurement biological impedance by applying an electric current to the electrode members in a state of being in contact with the user, and
specify user identification information corresponding to approximated biological impedance and the first load calculation value based on user information storage circuitry, using the measurement biological impedance and the loading state load calculation value, and
wherein, after the loading state and in the non-loading state where the load is removed from the loading unit, the control circuitry is configured to
calculate a non-loading state load calculation value as the second load calculation value which is calculated based on the load signal in the loading state and the load signal in the non-loading state,
specify user identification information based on the user information storage circuitry, the user identification information corresponding to the approximated biological impedance and the second load calculation value based on the measurement biological impedance and the non-loading state load calculation value when there is a difference between the non-loading state load calculation value and the loading state load calculation value and when the difference between the non-loading state load calculation value and the loading state load calculation value is equal to or greater than a predetermined threshold value, and
display on the display circuitry, the non-loading state load calculation value and lately specified user identification information.

11. The biological measurement apparatus according to claim 10, wherein the control circuitry displays the loading state load calculation value on the display circuitry calculated in the loading state, and redisplays the non-loading state load calculation value on the display circuitry calculated.

12. The biological measurement apparatus according to claim 10,
wherein the user information storage circuitry stores physical data of the user in association with the user identification information, and
wherein the control circuitry is configured to
calculate data regarding physical compositions using the physical data corresponding to the user identification information, the measurement biological impedance, and the loading state load calculation value specified user identification information in the loading state,
calculate data regarding physical compositions, using the physical data corresponding to the user identification information, the measurement biological impedance, and the non-loading state load calculation value specified user identification information in the non-loading state, and
display lately calculated data regarding the physical composition on the display circuitry.

13. A non-transitory storage medium comprising:
instructions that are configured to cause a computer to implement a method,
wherein the storage medium stores a machine-readable weight measurement program for the computer,
wherein the computer includes storage circuitry that is configured to store a first zero point in advance,
wherein the computer is connected to load detection circuitry configured to detect a load to a loading unit,
wherein the method comprises
causing the computer to function as control circuitry configured to calculate a first load calculation value and a second load calculation value using a load signal corresponding to the load to the loading unit based on an output of the load detection circuitry; and
causing the control circuitry to perform
a loading state measurement process for calculating a loading state load calculation value as the first load calculation value to be calculated based on the load signal in a loading state and the first zero point of the storage circuitry, wherein the load is applied to the loading unit in the loading state, and
a non-loading state measurement process for calculating a non-loading state load calculation value as the second load calculation value to be calculated based on the load signal in the loading state and the load signal in a non-loading state, and displaying the non-loading state load calculation value on display circuitry, wherein the load is removed from the loading unit in the non-loading state and after the loading state,
wherein the program is configured to cause the control circuitry to display the loading state load calculation value on the display circuitry in the loading state measurement process and redisplay the non-loading state load calculation value on the display circuitry in the non-loading state measurement process, and
wherein the program is configured to cause the control circuitry to determine whether to redisplay the non-loading state load calculation value calculated in the non-loading state on the display circuitry in accordance with a determination result regarding a difference between the first zero point stored in advance in the storage circuitry and a second zero point in the non-loading state.

14. A non-transitory storage medium comprising:
instructions that are configured to cause a computer to implement a method,
wherein the storage medium stores a machine-readable weight measurement program for the computer,
wherein the computer includes storage circuitry that is configured to store a first zero point in advance,
wherein the computer is connected to load detection circuitry configured to detect a load to a loading unit,
wherein the method comprises
    causing the computer to function as control circuitry configured to calculate a first load calculation value and a second load calculation value using a load signal corresponding to the load to the loading unit based on an output of the load detection circuitry; and
    causing the control circuitry to perform
        a loading state measurement process for calculating a loading state load calculation value as the first load calculation value to be calculated based on the load signal in a loading state and the first zero point of the storage circuitry, wherein the load is applied to the loading unit in the loading state, and
        a non-loading state measurement process for calculating a non-loading state load calculation value as the second load calculation value to be calculated based on the load signal in the loading state and the load signal in a non-loading state, and displaying the non-loading state load calculation value on display circuitry, wherein the load is removed from the loading unit in the non-loading state and after the loading state,
wherein the storage circuitry of the computer includes user information storage circuitry which stores user information including a stored load calculation value and user identification information in association with each other, and
wherein the program is configured to cause the control circuitry to
    specify the user identification information corresponding to the first load calculation value approximated to the loading state load calculation value based on the user information storage circuitry in the loading state measurement process,
    specify the user identification information corresponding to the second load calculation value approximated to the non-loading state load calculation value based on the user information storage circuitry in the non-loading state measurement process when there is a difference between the non-loading state load calculation value and the loading state load calculation value, and when the difference between the non-loading state load calculation value and the loading state load calculation value is equal to or greater than a predetermined threshold, and
    perform a user display process for displaying lately specified user identification information on the display circuitry.

15. A method for measuring weight by a computer which includes storage circuitry that is configured to store a first zero point in advance, the method comprising:
    causing the computer to function as control circuitry configured to calculate a first load calculation value and a second load calculation value using a load signal corresponding to a load applied to a loading unit based on an output from load detection circuitry connected to the computer and configured to detect a load to the loading unit; and
    causing the control circuitry to perform
        a loading state measurement process comprising calculating a loading state load calculation value as the first load calculation value to be calculated based on the load signal in a loading state and the first zero point of the storage circuitry wherein the load is applied to the loading unit in the loading state, and
        a non-loading state measurement process comprising calculating a non-loading state load calculation value as the second load calculation value to be calculated based on the load signal in the loading state and the load signal in a non-loading state, and displaying the non-loading state load calculation value on display circuitry, wherein the load is removed from the loading unit in the non-loading state and after the loading state,
wherein the method is configured to cause the control circuitry to display the loading state load calculation value on the display circuitry in the loading state measurement process and redisplay the non-loading state load calculation value on the display circuitry in the non-loading state measurement process, and
wherein the method is configured to cause the control circuitry to determine whether to redisplay the non-loading state load calculation value calculated in the non-loading state on the display circuitry in accordance with a determination result regarding a difference between the first zero point stored in advance in the storage circuitry and a second zero point in the non-loading state.

\* \* \* \* \*